(12) United States Patent
Thompson et al.

(10) Patent No.: US 12,210,226 B2
(45) Date of Patent: Jan. 28, 2025

(54) TEAR SHAPING FOR REFRACTIVE CORRECTION

(71) Applicant: TearOptix, Inc., Menlo Park, CA (US)

(72) Inventors: Vance M. Thompson, Sioux Falls, SD (US); Amitava Gupta, Roanoke, VA (US)

(73) Assignee: TearOptix, Inc., Meno Park, CA (US)

( * ) Notice: Subject to any disclaimer, the term of this patent is extended or adjusted under 35 U.S.C. 154(b) by 0 days.

(21) Appl. No.: 18/203,687

(22) Filed: May 31, 2023

(65) Prior Publication Data

US 2024/0004219 A1 Jan. 4, 2024

Related U.S. Application Data

(63) Continuation of application No. 16/892,983, filed on Jun. 4, 2020, now Pat. No. 11,703,695, which is a continuation of application No. 15/947,136, filed on Apr. 6, 2018, now Pat. No. 10,678,067.

(51) Int. Cl.
*G02C 7/04* (2006.01)

(52) U.S. Cl.
CPC ........... *G02C 7/04* (2013.01); *G02C 2202/20* (2013.01)

(58) Field of Classification Search
CPC ...... G02C 7/04; G02C 2202/20; G02C 7/049; G02C 7/047; G02C 2202/16
USPC .............. 351/41, 159.01, 159.02, 159.35
See application file for complete search history.

(56) References Cited

U.S. PATENT DOCUMENTS

| | | |
|---|---|---|
| 2,641,161 A | 6/1953 | Silvertstein |
| 3,246,941 A | 4/1966 | Moss |
| 3,416,530 A | 12/1968 | Ness |
| 3,594,074 A | 7/1971 | Rosen |
| 3,973,838 A | 8/1976 | Page |
| 3,995,635 A | 12/1976 | Higuchi et al. |
| 4,157,864 A | 6/1979 | Koller et al. |
| 4,194,815 A | 3/1980 | Trombley |
| 4,201,210 A | 5/1980 | Hughes |
| 4,235,985 A | 11/1980 | Tanaka et al. |
| 4,353,849 A | 10/1982 | Lewison |

(Continued)

FOREIGN PATENT DOCUMENTS

| | | |
|---|---|---|
| CA | 2539395 A1 | 4/2005 |
| EP | 0042679 A2 | 12/1981 |

(Continued)

OTHER PUBLICATIONS

Alverez-Lorenzo, Carmen, et al., "Contact Lenses for Drug Delivery: Achieving Sustained Release with Novel Systems", 2006, Am J Drug Deliv 2006;4(3): 131-151.

(Continued)

*Primary Examiner* — Tuyen Tra

(74) *Attorney, Agent, or Firm* — Merchant & Gould P.C.

(57) ABSTRACT

A lens for refractive tear shaping, including a curved lens body defining an anterior partial thickness cavity indented into its anterior surface. The anterior partial thickness cavity has an anterior facing tear shaping surface structured to form a tear lens within the anterior partial thickness cavity. The anterior partial thickness cavity is structured to define a tear lens within the anterior partial thickness cavity by interaction between a tear film of the eye and the anterior facing base tear shaping surface. The posterior curvature of the tear lens is dependent on the shape of the anterior facing base tear shaping surface.

20 Claims, 18 Drawing Sheets

(56) References Cited

U.S. PATENT DOCUMENTS

| | | |
|---|---|---|
| 4,464,026 A | 8/1984 | Comparetto |
| 4,652,099 A | 3/1987 | Lichtman |
| 4,744,647 A | 5/1988 | Meshel et al. |
| 4,886,350 A | 12/1989 | Wichterle |
| 5,114,686 A | 5/1992 | Gillespie |
| 5,245,367 A | 9/1993 | Miller et al. |
| 5,396,583 A | 3/1995 | Chen et al. |
| 5,580,498 A | 12/1996 | Sugiyama et al. |
| 5,658,602 A | 8/1997 | Martin et al. |
| 5,757,458 A | 5/1998 | Miller et al. |
| 5,804,107 A | 9/1998 | Martin et al. |
| 5,929,968 A | 7/1999 | Cotie et al. |
| 5,953,098 A | 9/1999 | Lieberman et al. |
| 5,980,040 A | 11/1999 | Xu et al. |
| 6,039,899 A | 3/2000 | Martin et al. |
| 6,312,393 B1 | 11/2001 | Abreu |
| 6,794,456 B2 | 9/2004 | Grobe, III |
| 6,880,932 B2 | 4/2005 | Doshi |
| 7,249,849 B2 | 7/2007 | Marmo et al. |
| 7,559,649 B2 | 7/2009 | Cotie et al. |
| 7,691,916 B2 | 4/2010 | McCabe et al. |
| 7,695,135 B1 | 4/2010 | Rosenthal |
| 7,699,464 B2 | 4/2010 | Iuliano |
| 7,864,440 B2 | 1/2011 | Berge |
| 8,118,426 B2 | 2/2012 | Cotie et al. |
| 8,149,512 B2 | 4/2012 | Kim |
| 8,184,068 B1 | 5/2012 | Rhodes |
| 8,184,069 B1 | 5/2012 | Rhodes |
| 8,216,306 B2 | 7/2012 | Coroneo |
| 8,228,315 B1 | 7/2012 | Starner |
| 8,450,387 B2 | 5/2013 | McCabe et al. |
| 8,459,793 B2 | 6/2013 | de Juan, Jr. et al. |
| 8,471,783 B2 | 6/2013 | Rhodes |
| 8,480,227 B2 | 7/2013 | Qiu et al. |
| 8,482,487 B1 | 7/2013 | Rhodes |
| 8,506,944 B2 | 8/2013 | Sullivan et al. |
| 8,599,490 B2 | 12/2013 | Lee |
| 8,736,692 B1 | 5/2014 | Wong |
| 8,742,623 B1 | 6/2014 | Biederman et al. |
| 8,764,185 B1 | 7/2014 | Biederman et al. |
| 8,827,447 B2 | 9/2014 | Awasthi et al. |
| 8,864,306 B2 | 10/2014 | de Juan, Jr. et al. |
| 8,867,141 B2 | 10/2014 | Pugh |
| 8,895,763 B2 | 11/2014 | Reif |
| 8,911,083 B2 | 12/2014 | Brent |
| 8,985,763 B1 | 3/2015 | Etzkorn et al. |
| 9,046,699 B2 | 6/2015 | Caldarise |
| 9,198,752 B2 | 12/2015 | Woods |
| 9,310,627 B2 | 4/2016 | Havenstrite et al. |
| 9,395,557 B2 | 7/2016 | Thompson |
| 9,551,885 B2 | 1/2017 | Sindt et al. |
| 9,668,916 B2 | 6/2017 | Thompson |
| 9,869,883 B2 | 1/2018 | Thompson |
| 9,910,295 B2 | 3/2018 | Thompson |
| 10,353,220 B2 | 7/2019 | Thompson |
| 10,449,086 B2 | 10/2019 | Thompson |
| 10,548,767 B2 | 2/2020 | Thompson |
| 10,678,067 B2 | 6/2020 | Thompson |
| 10,684,493 B2 | 6/2020 | Thompson |
| 10,959,834 B2 | 3/2021 | Thompson |
| 2002/0063848 A1 | 5/2002 | Fiala |
| 2003/0105521 A1 | 6/2003 | Perez |
| 2003/0125498 A1 | 7/2003 | McCabe et al. |
| 2003/0162862 A1 | 8/2003 | McCabe et al. |
| 2004/0096477 A1 | 5/2004 | Chauhan et al. |
| 2005/0046794 A1 | 3/2005 | Silvestrini |
| 2006/0007391 A1 | 1/2006 | McCabe et al. |
| 2006/0132707 A1 | 6/2006 | Tung |
| 2007/0016292 A1 | 1/2007 | Perez |
| 2007/0225691 A1 | 9/2007 | Silvestrini et al. |
| 2007/0229757 A1 | 10/2007 | McCabe et al. |
| 2007/0242216 A1 | 10/2007 | Dootjes |
| 2007/0298220 A1 | 12/2007 | Noda |
| 2008/0002149 A1 | 1/2008 | Fritsch |
| 2008/0015282 A1 | 1/2008 | McCabe et al. |
| 2008/0024717 A1 | 1/2008 | Kim |
| 2008/0182956 A1 | 7/2008 | Stanbro et al. |
| 2008/0243095 A1 | 10/2008 | Kaiser |
| 2008/0316424 A1 | 12/2008 | McCabe et al. |
| 2010/0072642 A1 | 3/2010 | Broad et al. |
| 2010/0084775 A1 | 4/2010 | McCabe et al. |
| 2010/0092452 A1 | 4/2010 | Sullivan et al. |
| 2010/0133710 A1 | 6/2010 | McCabe et al. |
| 2010/0232031 A1 | 9/2010 | Batchko |
| 2010/0233241 A1 | 9/2010 | Leahy et al. |
| 2011/0059902 A1 | 3/2011 | Sullivan et al. |
| 2011/0070222 A1 | 3/2011 | Sullivan et al. |
| 2011/0116034 A1 | 5/2011 | Goto et al. |
| 2011/0142908 A1 | 6/2011 | Sullivan et al. |
| 2011/0146206 A1 | 6/2011 | Stanbro et al. |
| 2011/0184358 A1 | 7/2011 | Weiner |
| 2011/0273663 A1 | 11/2011 | Pugh |
| 2011/0282328 A1 | 11/2011 | Ambati et al. |
| 2012/0193822 A1 | 8/2012 | McCabe et al. |
| 2012/0245444 A1 | 9/2012 | Otis et al. |
| 2012/0268711 A1 | 10/2012 | Lai |
| 2012/0321611 A1 | 12/2012 | Sullivan et al. |
| 2013/0053953 A1 | 2/2013 | Silvestrini |
| 2013/0077044 A1 | 3/2013 | de Juan, Jr. et al. |
| 2013/0225715 A1 | 8/2013 | McCabe et al. |
| 2013/0237631 A1 | 9/2013 | McCabe et al. |
| 2013/0261569 A1 | 10/2013 | Weiner et al. |
| 2013/0265507 A1 | 10/2013 | Ford et al. |
| 2013/0278890 A1 | 10/2013 | de Juan, Jr. et al. |
| 2014/0192315 A1 | 7/2014 | Liu et al. |
| 2014/0192327 A1 | 7/2014 | Sindt et al. |
| 2014/0377327 A1 | 12/2014 | Davis et al. |
| 2015/0041736 A1 | 2/2015 | McCabe et al. |
| 2015/0092156 A1 | 4/2015 | Qiu et al. |
| 2015/0157315 A1 | 6/2015 | Theobald |
| 2015/0305929 A1 | 10/2015 | Goldberg et al. |
| 2015/0366708 A1 | 12/2015 | Lerner |
| 2016/0054589 A1 | 2/2016 | Otts et al. |
| 2016/0056508 A1 | 2/2016 | Flitsch et al. |
| 2016/0067035 A1 | 3/2016 | Gontijo |
| 2016/0223836 A1 | 8/2016 | Havenstrite et al. |
| 2016/0266405 A1 | 9/2016 | Thompson |
| 2017/0082869 A1 | 3/2017 | Sindt et al. |
| 2017/0087014 A1 | 3/2017 | Potter, Jr. et al. |
| 2017/0160432 A1 | 6/2017 | Havenstrite et al. |
| 2017/0242271 A1 | 8/2017 | Pugh et al. |
| 2017/0329053 A1 | 11/2017 | Wang et al. |
| 2018/0001581 A1 | 1/2018 | Patel et al. |
| 2020/0004046 A1 | 1/2020 | Thompson et al. |
| 2020/0085564 A1 | 3/2020 | Thompson |
| 2020/0237555 A1 | 7/2020 | Thompson |
| 2020/0301169 A1 | 9/2020 | Thompson |
| 2020/0310160 A1 | 10/2020 | Thompson |
| 2022/0031505 A1 | 2/2022 | Thompson |
| 2022/0117723 A1 | 4/2022 | Thompson |
| 2022/0308363 A1 | 9/2022 | Thompson |
| 2023/0221580 A1 | 7/2023 | Thompson |
| 2023/0404798 A1 | 12/2023 | Thompson |

FOREIGN PATENT DOCUMENTS

| | | |
|---|---|---|
| EP | 1629317 A2 | 3/2006 |
| EP | 2276496 A1 | 1/2011 |
| EP | 2276497 A1 | 1/2011 |
| EP | 2632532 A2 | 9/2013 |
| FR | 2740232 | 4/1997 |
| JP | 2951334 | 7/1999 |
| KR | 20050052442 A | 6/2005 |
| KR | 2020140003482 | 6/2014 |
| WO | WO1995008135 | 3/1995 |
| WO | WO1997034185 | 9/1997 |
| WO | WO2001033284 | 5/2001 |
| WO | WO2002006883 | 1/2002 |
| WO | WO2003022321 | 3/2003 |
| WO | WO2004109368 | 12/2004 |
| WO | WO2005034730 | 4/2005 |
| WO | WO2005121874 | 12/2005 |
| WO | WO2007008666 | 1/2007 |
| WO | WO2009069264 | 6/2009 |

(56) References Cited

FOREIGN PATENT DOCUMENTS

| WO | WO2009137602 | 11/2009 |
|---|---|---|
| WO | WO2009137603 | 11/2009 |
| WO | WO2010105130 | 9/2010 |
| WO | WO2011050287 | 4/2011 |
| WO | WO2012051223 | 4/2012 |
| WO | WO2012058382 | 5/2012 |
| WO | WO2014012016 | 1/2014 |
| WO | WO2014074477 | 5/2014 |
| WO | WO2014100836 | 6/2014 |
| WO | WO2014205252 | 12/2014 |
| WO | WO2015073758 | 5/2015 |
| WO | WO2016014403 | 1/2016 |
| WO | WO2016090863 | 6/2016 |
| WO | WO2016115369 | 7/2016 |
| WO | WO 2016/144483 | 9/2016 |
| WO | WO2016145204 | 9/2016 |
| WO | WO2017037611 | 3/2017 |
| WO | WO2017053673 | 3/2017 |
| WO | WO2017096087 | 6/2017 |
| WO | WO2017103793 | 6/2017 |

OTHER PUBLICATIONS

Application and File History for U.S. Appl. No. 14/644,809, filed Mar. 11, 2015. Inventor: Vance M. Thompson.
Application and File History for U.S. Appl. No. 15/295,013, filed Oct. 17, 2016. Inventor: Vance M. Thompson.
Application and File History for U.S. Appl. No. 15/858,397, filed Dec. 29, 2017. Inventor: Vance M. Thompson.
Application and File History for U.S. Appl. No. 15/947,136, filed Apr. 6, 2018. Inventor: Vance M. Thompson.
Ciolino et al., "In vivo performance of a drug-eluting contact lens to treat glaucoma for a month", Biomaterials, 35 (2014), 432-439.
European Extended Search Report in Application 19781457.7, mailed Dec. 21, 2021, 8 pages.
Innovative drug-dispensing contact lens delivers glaucoma mediation continuously for a month, Ophthalmology, Dec. 9, 2013, 2 pages.
PCT International Preliminary Report on Patentability and Written Opinion for International Application No. PCT/US2019/025765, filed Apr. 4, 2019, 7 pages.
PCT International Preliminary Report on Patentability for International Application No. PCT/US2016/017792, dated Sep. 12, 2017, 8 pages.
PCT International Search Report and Written Opinion for International Application No. PCT/US2019/025765, dated Jul. 18, 2019, 9 pages.
PCT International Search Report for International Application No. PCT/US2014/063696, dated Feb. 12, 2015.
PCT International Search Report for International Application No. PCT/US2016/017792 dated May 11, 2016.
PCT Written Opinion for International Application No. PCT/US2014/063696, dated Feb. 12, 2015.
Piggyback Lens for Advanced Keratoconus, prior to Dec. 6, 2013, pp. 18-19.
Ren et al., "Adaptive Liquid Lens by Changing Aperture," Journal of Microelectromechanical Systems, vol. 21, No. 4, pp. 953-958, Aug. 2012.
Severinsky et al., "Current applications and efficacy of sclera contact lenses—a retrospective study", J Optom. 2010;3(3):158-163.
STIC Search, 50 pages, Oct. 28, 2016.

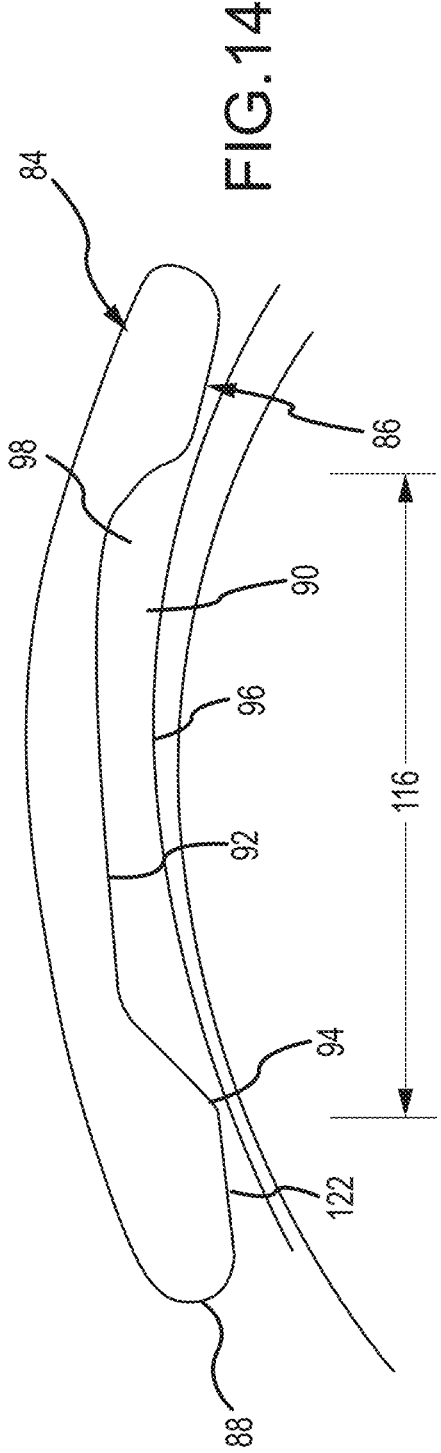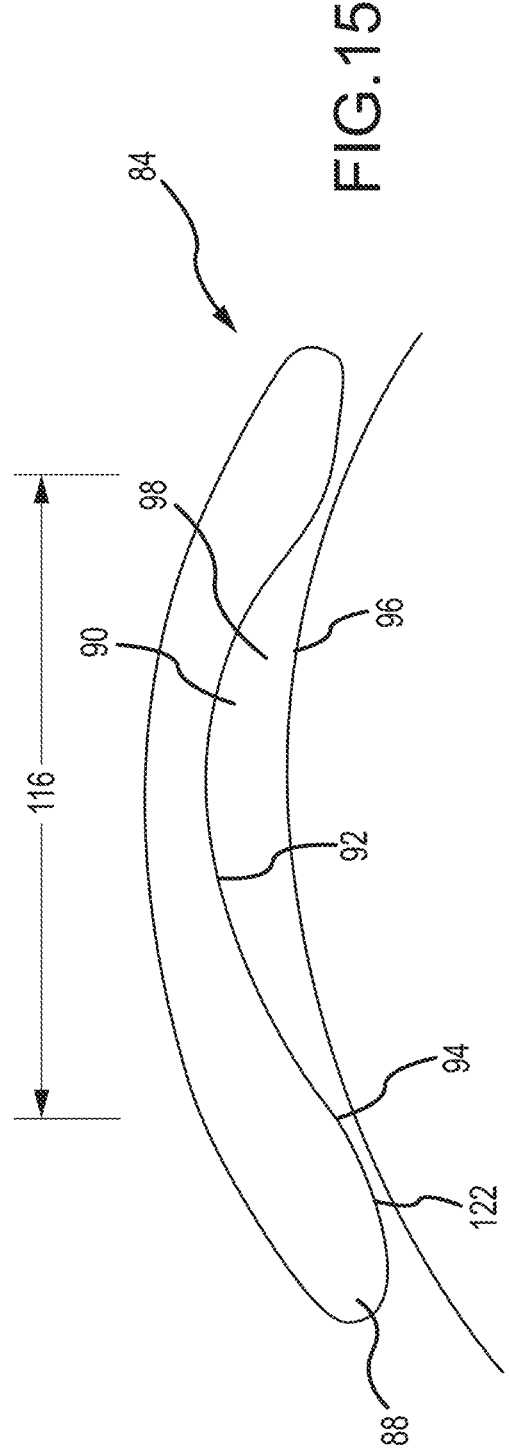

TEAR SHAPING FOR REFRACTIVE CORRECTION

RELATED APPLICATIONS

This application is a continuation of U.S. patent application Ser. No. 16/892,983, filed Jun. 4, 2020, now U.S. Pat. No. 11,703,695, which is a continuation of U.S. patent application Ser. No. 15/947,136, now U.S. Pat. No. 10,678,067, filed Apr. 6, 2018, the disclosures of which are incorporated herein by reference.

TECHNICAL FIELD

The invention generally relates to contact lenses and refractive correction by application of contact lenses or other structures to the eye.

BACKGROUND

Known contact lenses generally cover virtually the entire cornea or cover the cornea centrally while leaving a portion of the peripheral cornea uncovered. Contact lenses known to the Applicant achieve refractive correction because of the optical nature of an optically transparent, rigid, semi-rigid or flexible material that refracts light and thus alters the refraction of light striking the cornea and passing through the other optical parts of the eye to an image formed on the retina.

The concept of a tear lens is known to exist in the context of conventional contact lenses. The tear lens is formed by a layer of tears bounded on an anterior surface by the back of a contact lens optical zone and at a posterior surface of the tear lens by the surface of the corneal epithelium. A tear lens, as understood in this conventional sense, contributes to refractive correction primarily in the context of rigid contact lenses. This is because the posterior surface of the rigid contact lens maintains its shape and curvature independent of the shape of the cornea and affects the focusing of light in addition to the refractive power of the contact lens. While a tear lens technically exists in the context of flexible or soft contact lenses, the effect of the tear lens on refraction is negligible because of the general conformity of the soft contact lens shape to the shape of the cornea.

Numerous possible complications are known to exist with use of contact lenses on the cornea even though modern contact lenses cause fewer complications than contact lenses of decades ago. The presence of contact lenses can lead to stasis and entrapment of the tear film which can lead to an accumulation of corneal epithelial waste products in the entrapped tear film. Corneal epithelial waste products in high enough concentrations can be toxic to the cells of the corneal epithelium. Mechanical interaction between the posterior surface of the contact lens and the corneal epithelium can lead to abrasion or distortion. Entrapment of solid objects, however tiny between the posterior surface of the contact lens and the anterior corneal epithelium can also lead to corneal epithelial abrasion. Under some circumstances, the reduction of oxygen available to the corneal epithelium by having the barrier of the contact lens between the corneal epithelium and the atmosphere can lead to health complications for the corneal epithelium as well.

There is still room for improvement in the arts of refractive correction by application of lenses and other structures to the eye.

SUMMARY

Embodiments of the invention solve many of the above stated problems by providing a lens having an anterior central cavity which centers on the optical axis of the eye or by other structures which can be applied to the eye to create a desired refractive effect by tear shaping.

According to an example embodiment, the central opening is structured such that capillary action forms a meniscus of tears in the opening. According to an example embodiment of the invention, the inventive lens is structured so that a concave meniscus is formed. The concave meniscus is provided for correction of myopia. It is expected that a concave meniscus will form in a relatively larger diameter opening according to embodiments of the invention. According to an example embodiment of the invention, the diameter of the central opening or central cavity falls in a range from 1.0 to 5.0 millimeters. According to another example embodiment the diameter of the central opening falls in a range from 2.0 to 3.0 millimeters and in another example embodiment 2.5 to 2.8 millimeters. A further example embodiment presents a central opening of 2.8 to 3.5 millimeters.

According to another example embodiment of the application, a convex meniscus is formed. A convex meniscus is expected to form in a case of a smaller diameter opening in the lens which generally overlies the optical axis of the eye.

Formation of the tear meniscus is affected by a number of factors including: tear production, rate of evaporation; temperature, posture of the lens user. These factors can be considered in design of the lens according to the invention.

In the case of a central cavity, the anterior surface of the cavity located on the posterior surface of the lens borders and determines the shape of the tear film posterior to the lens and between the posterior lens and the anterior cornea. The tears thus form a lens component that has a refractive effect in addition to the refractive effect of the contact lens.

According to another example embodiment of the invention, the opening is non-circular in structure. For example, an oval opening is expected to create a meniscus having a first curvature in a first axis and a second curvature in a second axis and thereby permitting correction of astigmatism by the tear meniscus formed. According to example embodiments of the invention, the central opening may be oval in shape or polygonal having a first axis longer than a second axis to achieve the astigmatic correction.

According to example embodiments of the invention, the cross-sectional shape of the edge or periphery of the opening may vary when viewed in cross-section.

According to an example embodiment, the cross-sectional shape of the periphery of the opening may demonstrate a thick rim. According to another example embodiment, the cross-sectional shape of the periphery of the opening may demonstrate the thin rim.

According to another embodiment, the cross-sectional shape of the periphery of the opening may demonstrate a straight rim. The straight rim may be substantially radial in orientation as compared to the curvature of the lens and opening or may be tilted to create an acute or obtuse angle relative to a tangent to the corneal surface.

According to another example embodiment of the invention, the periphery of the opening may demonstrate a concave shape when viewed in cross section.

According to another example embodiment of the invention, the periphery of the opening may demonstrate a convex shape when viewed in cross section.

According to another example embodiment of the invention, the cross-sectional shape of the periphery of the opening may demonstrate a polygonal cross-section which may be either concave or convex.

According to other example embodiments of the invention, the cross-sectional shape of the rim may vary around the circumference of the periphery of the opening. For example, a portion or portions of the periphery of the opening when viewed in cross-section may be concave while other portions may be convex.

According to another example embodiment of the invention, the perimeter of the rim may vary in shape when viewed in an anterior-posterior direction.

According to another example embodiment of the invention, the perimeter of the rim viewed anterior to posterior may have a smooth continuous curved shape.

According to another example embodiment of the invention, the perimeter of the rim when viewed anterior to posterior may include indentations in the rim perimeter.

According to another example embodiment of the invention, the rim perimeter may include appendages extending inwardly from the rim.

According to another example embodiment of the invention, the periphery of the opening when viewed in an anterior to posterior direction may have a circular shape. According to another example embodiment of the invention, the periphery of the opening when viewed in an anterior to posterior direction may have an oval shape and according to another example embodiment of the invention, the periphery of the opening in viewed in an anterior to posterior direction may have a polygonal shape. The polygonal shape may include a regular polygon or an irregular polygon shape. The polygon may be generally radially symmetrical or may be other than radially symmetrical.

According to another example embodiment of the invention, a contact lens includes a centrally located partial depth opening or cavity located centrally on the posterior concave surface of the lens. For example, the cavity may have a diameter of 2 mm to 5 mm at the center of the posterior surface of the lens. According to an example embodiment of the invention, the center or the centroid of the partial depth cavity is collinear with the optical center of the lens and when placed on an eye is substantially aligned with the optical axis of the eye. The partial depth cavity is bounded by an anterior surface which coincides with the posterior surface of the lens within the cavity. In situ, the cavity is also bounded by the anterior surface of the cornea. The anterior to posterior depth of the cavity according to an example embodiment is not less than 25 microns and not more than 100 microns as measured from a center of the tear shaping surface and to an imaginary extension of a base curve of the curved lens body. In this embodiment the base curve of the lens is considered to be the posterior curve immediately surrounding the partial depth cavity.

According to example embodiments of the invention, the shaped posterior surface of the lens within the cavity may have a radius of curvature that is more or less than the radius of curvature of the anterior cornea in the region of the cornea where the cavity is located when the lens is on an eye. According to known optics, a shaped posterior surface of the lens having a radius of curvature greater than the radius of curvature of the anterior corneal surface will generally provide a space in which a negative powered tear lens is formed. Conversely, a shaped posterior surface lens bounding the cavity having a radius of curvature less than the radius of curvature of the corneal region that bounds the rear of the cavity will generally lead to a tear lens having positive optical power.

According to another example embodiment of the invention, the lens body may define one or more passages having a diameter of no more than about 2 microns and no less than about 0.5 microns. These passages extend from the posterior lens to the anterior lens surface through the body of the contact lens. The openings are expected to promote tear exchange and oxygen exchange between tears under the lens and tears anterior to the lens.

According to another example embodiment of the invention, the lens or structure for refractive tear shaping includes a lens body presenting an anterior partial thickness cavity. A contact lens, for example, a soft contact lens, having a partial thickness cavity can be placed on an eye. In situ, the partial thickness cavity will fill with tear fluid. The column of tear fluid, in combination with the surface curvature of the base or posterior surface of the cavity, the layer of contact lens material behind the partial thickness cavity, the tear film and cornea make up a complex optic or optical combination that provides several elements of adjustable dimensions and properties that may be utilized to form an optic or optical combination having desired refractive properties. For example, the shape and contour of the base of the partial thickness cavity may be varied in curvature, toricity, perimeter shape or a combination of the foregoing. In a further example, the thickness of the material way are posterior to the base of the partial thickness cavity may be varied. In another example, the base or posterior curve of the contact lens may be altered in curvature or toricity. The base of the partial thickness cavity, the base curve of the contact lens or both may include a diffractive optical surface.

For example, the base surface or posterior base of the partial thickness cavity may have a curvature greater than, less than or equal to the curvature of the posterior surface of the contact lens which generally conforms to the anterior surface of the cornea.

According to another example embodiment, the base surface or posterior base of the partial thickness cavity may have a diffractive surface relief.

According to an example embodiment of the invention, a soft or rigid contact lens has a partial depth cavity located proximate a center of the lens to form and accommodate a tear fluid reservoir.

A diameter of the partial depth cavity, according to an example embodiment of the invention, is in the range of 2.0 mm to 6.0 mm. According to another example embodiment the diameter is between 3.0 mm and 5.0 mm.

The contact lens, according to an example embodiment, has a thickness ranging from 50 µm to 500 µm, according to another example embodiment between 80 µm and 350 µm at its optical center. The partial thickness cavity is bounded posteriorly by a layer of contact lens material the thickness of which may vary between 10 µm and 100 µm according to an example embodiment. According to another example embodiment the thickness may vary between 25 µm and 75 µm.

The thickness of a contact lens is generally measured as a center thickness. That is, the thickness of the contact lens at the geometrical center of the contact lens. In the case of embodiments of the present invention, the center thickness is affected by the presence of the anterior partial thickness cavity. Accordingly, center thickness in the context of this embodiment of the invention is considered to be the thickness from the posterior concave surface of the contact lens to an imaginary extension of the anterior surface of the contact lens that would exist if the partial thickness cavity were not present.

According to example embodiments of the invention, when the contact lens is centered on the cornea the partial thickness cavity is centered so that its center generally aligns with the corneal apex. It is expected that typically the error in centration of the partial depth cavity with respect to the corneal apex is less than approximately 0.5 mm and in another example embodiment less than 0.25 mm. The corneal apex generally coincides with the visual axis of the eye although there is some variation between the location of the visual axis and the corneal apex.

According to an example embodiment of the invention, the base surface of the partial depth cavity has a radius of curvature less than the radius of curvature of the posterior surface of the contact lens. According to this example embodiment of the invention, the optic or optical combination created by the partial depth cavity extending over the center of the contact lens optics includes three surfaces. The three surface include the first interface between the tears that fill the anterior partial depth cavity, the second interface between the tears filling the cavity and the material of the lens at the base of the partial depth cavity and the third interface between the posterior concave surface of the lens and the tear film layer behind it. In addition, the anterior corneal surface optically interacts with this example embodiment and thus, a fourth surface is taken into account. The fourth surface is formed by the anterior cornea which has a radius of curvature $r_1$. The third surface is formed by the posterior surface of the contact lens for example, a soft contact lens, which has a radius $r_2$. The base surface of the partial depth cavity which forms the second surface has a radius of curvature $r_3$. The anterior surface of the contact lens to which the interface between the tear film and the atmosphere is expected to conform, has a radius of curvature $r_4$.

To summarize according to an example embodiment:
$r_1$ represents the radius of curvature of the anterior corneal surface;
$r_2$ represents the radius of curvature of the posterior surface of the soft contact lens;
$r_3$ represents the radius of curvature of the base surface of the partial depth cavity; and
$r_4$ represents the radius of curvature of the anterior surface of the contact lens or anterior interface of the tear film within the partial thickness cavity.

If it is determined that the anterior tear film does not substantially conform to the anterior curvature of the contact lens adjustments can be made to the calculation to take this factor into account as is understood by those having skill in the art.

In a typical circumstance utilizing a soft contact lens, $r_1$ is equal to $r_2$ or approximately equal to $r_2$ unless a keratoprosthesis (an artificial corneal implant) is present in the cornea. The contact lens may have a total power that is positive or negative or the contact lens may have no net refractive power. Radius of curvature $r_4$ can be less than, more than or equal to $r_2$. The relationship between $r_3$ and $r_2$ along with the thickness of the optical segment determine the refractive power of the optical segment that is represented by the central zone of the partial depth cavity when filled with tears. Toric optical surfaces and consequent astigmatic focusing can also be taken into account utilizing known optical principles. An optical train of this sort can be modeled using various optical software programs, for example, Zemax.

In this example embodiment, the central optical element created by the partial depth cavity is expected to be used to correct hyperopia, provide add power to fully meet or partially meet accommodative needs of a patient with presbyopia or be used to meet other refractive requirements related to for example, astigmatism.

According to another example embodiment, the base surface of the partial depth cavity has a radius of curvature more than the radius of curvature of the posterior surface of the contact lens. Accordingly, it is expected that the central optical element will provide a negative refractive power that may be used to provide an enhancement of the field of view and depth of field, as an example.

According to another example embodiment, the base surface of the partial thickness cavity includes a diffractive surface profile. The diffractive surface profile may for example include a phase plate surface for phase modulation or, according to another example embodiment, a phase wrapped surface for amplitude modulation.

Typically, the diffractive optic according to example embodiments of the invention is designed according to equation 1.

$$r_n = 2nf\lambda \qquad \text{Eq (1)}$$

wherein r represents the radius of curvature of the diffractive element, n represents refractive index or the refractive index difference (if the diffractive optic is immersed in a fluid having a refractive index other than that of air), f represents focal length and $\lambda$ is the wavelength of light. According to example embodiments of the invention, the diffractive optical element is immersed in a fluid, the tear film, having a refractive index different than air which is known.

According to example embodiments of the invention, a diffractive optic may be used to provide a plus power for augmentation of natural accommodation for viewing near objects such as reading. Expected advantages are that a diffractive optic may demonstrate a wider field of view and also may be utilized to correct for spherical aberration or astigmatism.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 14 is a cross-sectional view of a contact lens having a partial depth cavity with an anterior boundary flatter in curvature than the cornea in situ on a cornea according to an example embodiment of the invention;

FIG. 15 is a cross-sectional view of a partial depth cavity contact lens having a curvature steeper than the anterior cornea;

Figure 1:
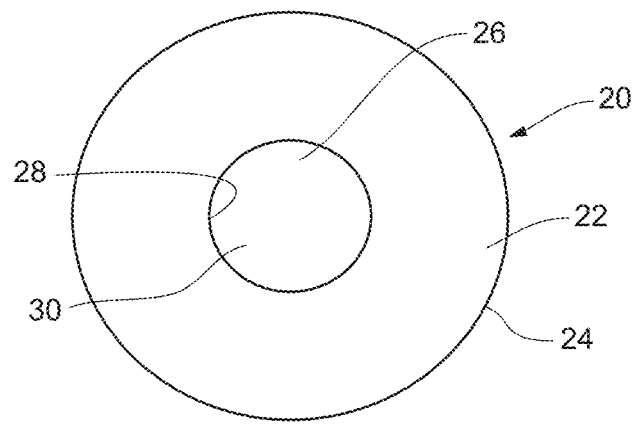
FIG. 1 is an anterior to posterior view of a lens for refractive tear shaping having a circular central opening therein.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Referring to FIGS. 1-13, embodiments of the invention are directed to lens or structure for refractive tear shaping 20 wherein refractive correction is achieved or enhanced by the shaping of the tear film.

Referring particularly to FIGS. 1-6, lens for refractive tear shaping 20 according to an example embodiment of the invention generally includes lens body 22 having peripheral edge 24 and defining central opening 26. Central opening 26 is surrounded by a tear shaping edge 28. According to the depicted embodiment, tear shaping edge 28 defines circular central opening 30. Tear shaping edge 28 can have a number of cross sectional structures and shapes as described below.

Figure 2:
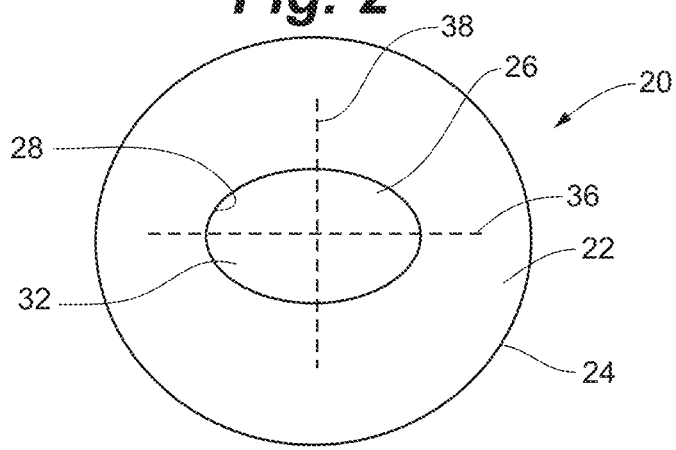
FIG. 2 is an anterior to posterior view of a lens for refractive tear shaping having an oval central opening therein.

Referring now to FIG. 2, another embodiment of lens for refractive tear shaping 20 is depicted. The depicted embodiment includes lens body 22 having peripheral edge 24 and elliptical or oval central opening 32. Elliptical or oval central opening 32 is bounded by tear shaping edge 28.

Figure 3:
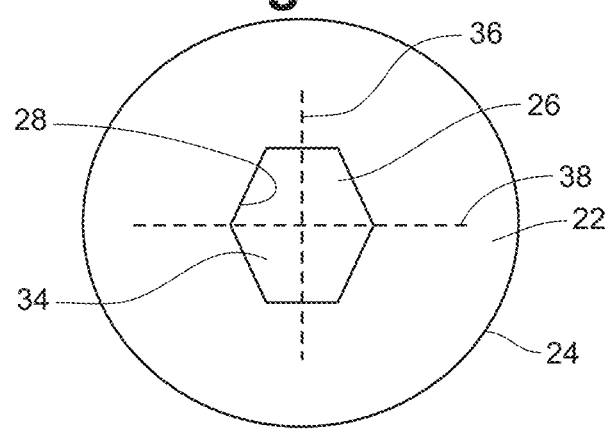
FIG. 3 is a lens for refractive tear shaping having a polygonal opening therein.

Referring to FIG. 3, another embodiment of lens for refractive tear shaping 20 is depicted having polygonal central opening 34. Polygonal central opening 34 is depicted as an irregular hexagon, however polygonal central opening 34 may have more or less than six sides and six vertices.

Referring particularly to FIGS. 2 and 3, elliptical or oval central opening 32 and polygonal central opening 34 may have long axis 36 and short axis 38.

Figure 4:
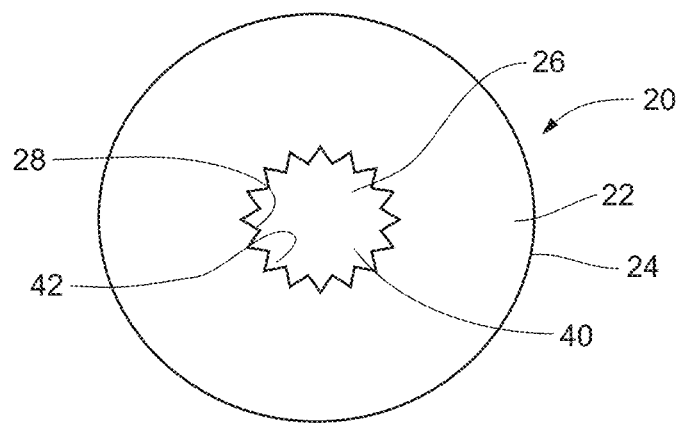
FIG. 4 is an anterior to posterior view of a lens for refractive tear shaping having a stellate opening with indentations according to an example embodiment of the invention.

Referring now to FIG. 4, according to another embodiment, lens for refractive tear shaping 20 defines stellate opening 40 having indentations into the material of the lens surrounding stellate opening 40. While stellate opening 40 is depicted as circularly symmetrical, stellate opening 40 may also have long axis 36 and short axis 38.

Figure 5:
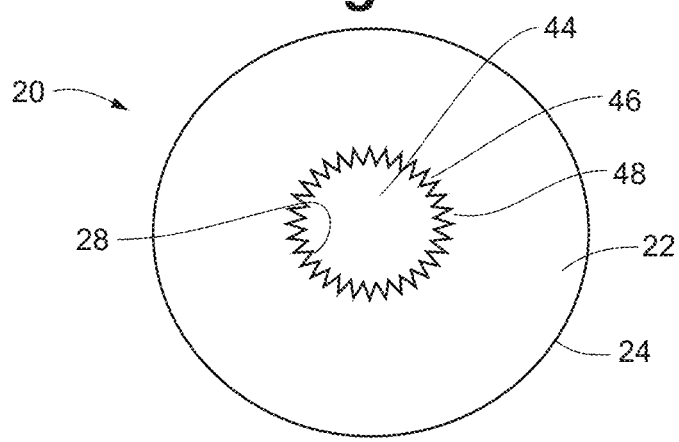
FIG. 5 is an anterior to posterior view of a lens for refractive tear shaping having a stellate opening with appendages according to an example embodiment of the invention.

Referring now to FIG. 5, another embodiment of lens for refractive tear shaping 20 is depicted. According to the depicted embodiment, stellate opening with appendages 44 is depicted. Appendages 46 extend inwardly from outer edge 48. While depicted as circularly symmetrical, stellate opening with appendages 44 may also have long axis 36 and short axis 38.

Figure 6:
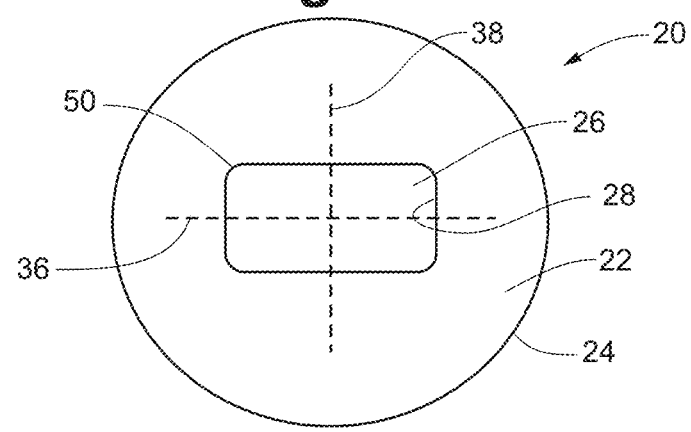
FIG. 6 is an anterior to posterior view of a lens for refractive tear shaping having a generally rectangular polygonal opening therein according to an example embodiment of the invention.

Referring now to FIG. 6, lens for refractive tear shaping 20 with rectangular opening 50 is depicted. Rectangular opening 50 is depicted having a particular proportional aspect ratio, however this should not be considered limiting as the aspect ratio of rectangular opening 50 may be altered by altering the length of long axis 36 as compared to short axis 38.

Referring now to FIGS. 7-13, cross-sectional views of example embodiments of lens for refractive tear shaping 20 are depicted.

Figure 7:
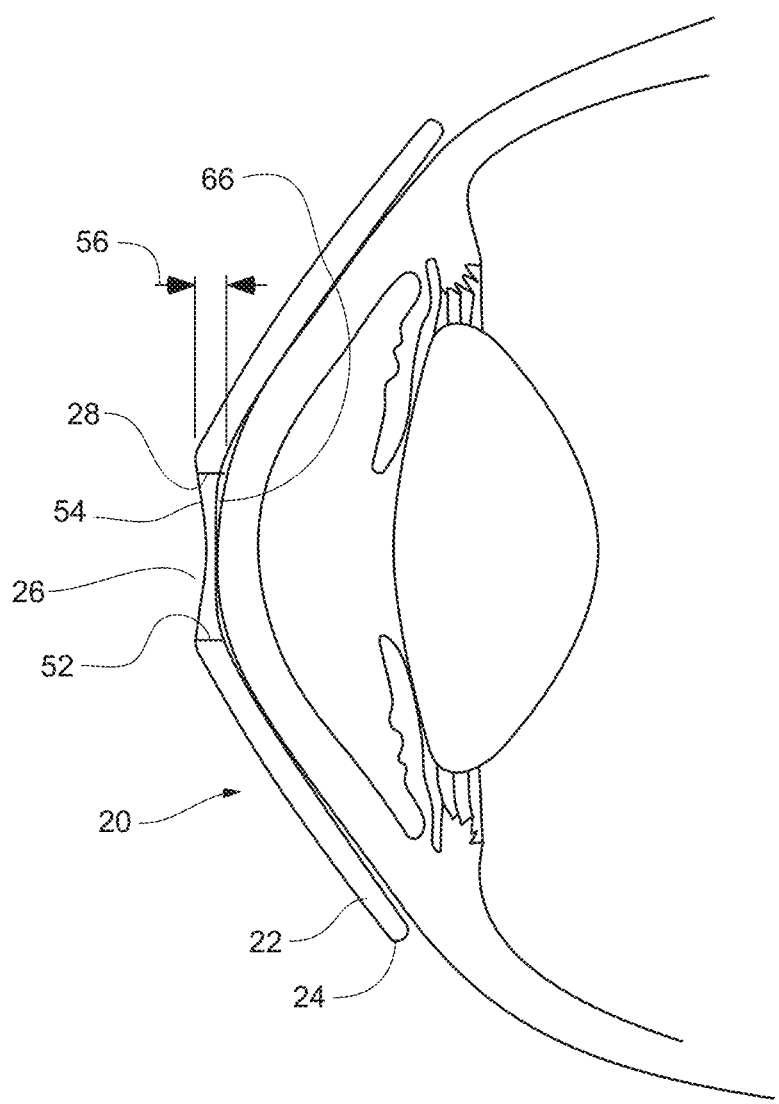
FIG. 7 is a cross-sectional view of a lens for refractive tear shaping in situ on a cornea and with a concave tear meniscus according to any example embodiment of the invention.

Referring particularly to FIG. 7, an embodiment of the invention including parallel tear shaping edge 52 is depicted. It is noted that lens body 22 in the embodiment depicted in FIG. 7 that parallel tear shaping edge 52 is generally parallel on opposing sides of central opening 26. Also depicted in FIG. 7 is concave tear meniscus 54. Concave tear meniscus 54 affects a negative refractive power due to its concave shape and is expected to contribute focusing power for correction of myopia. It is expected that the concavity of concave tear meniscus 54 will vary with the size of central opening 26 and with the depth 56 of tear shaping edge 28.

It is expected that to a certain point smaller diameter of central opening 26 will create a more steeply curved concave tear meniscus imparting greater negative refractive power and stronger correction for myopia. It is also expected that increasing depth 56 of tear shaping edge 28 will increase negative refractive power to a certain degree. As discussed above, central opening 26 may have various shapes, some of which include a long axis 36 and short axis 38.

It is expected that by judicious selection of the size of long axis 36 and short axis 38 that astigmatism may be corrected by creating a concave tear meniscus 54 having different shape and therefore differing power on various meridians.

Figure 8:
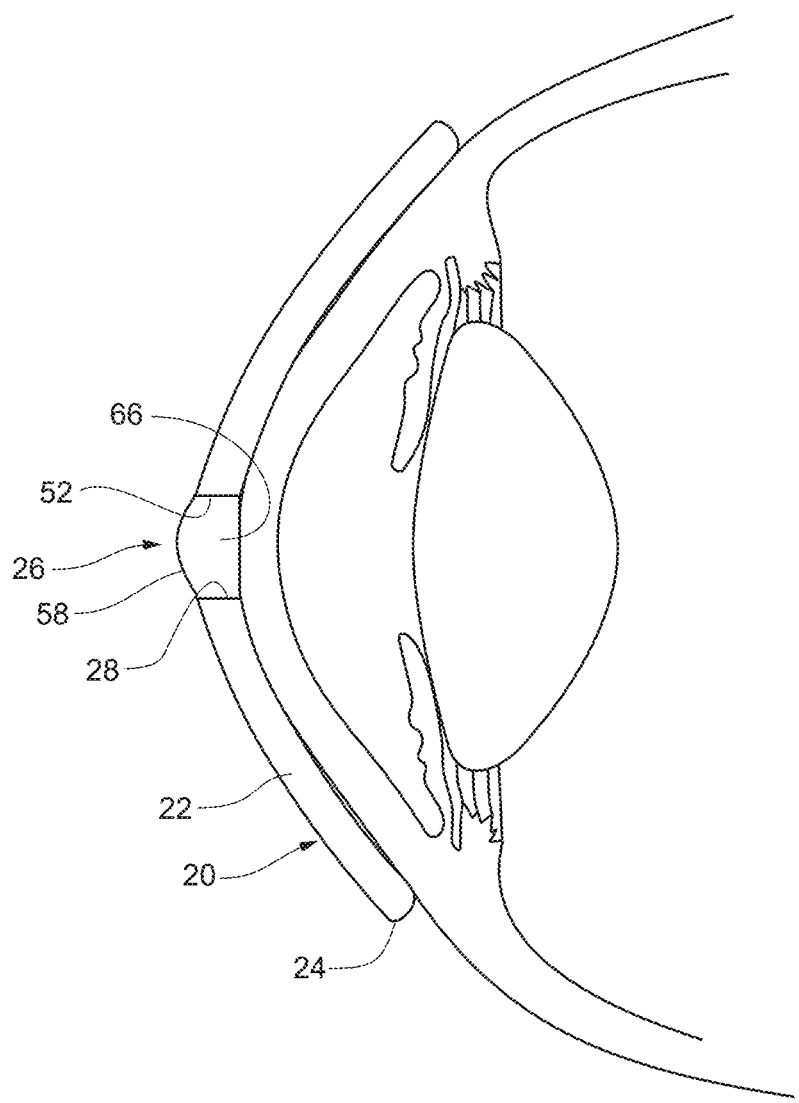
FIG. 8 is a cross-sectional view of a lens for refractive tear shaping in situ on a cornea with a convex tear meniscus according to an example embodiment of the invention.

Referring now to FIG. 8, lens for refractive tear shaping 20 having parallel tear shaping edge 52 is sized and configured to create convex tear meniscus 58. It is expected that when the size of central opening 26 is reduced to a sufficient degree, convex tear meniscus 58 will be formed in central opening 26. FIG. 8 depicts parallel tear shaping edge 52 along with a smaller diameter central opening 26 than does FIG. 7. It is expected that when the size of central opening 26 and depth 56 of tear shaping edge are appropriate convex tear meniscus 58 will be formed.

Figure 9:
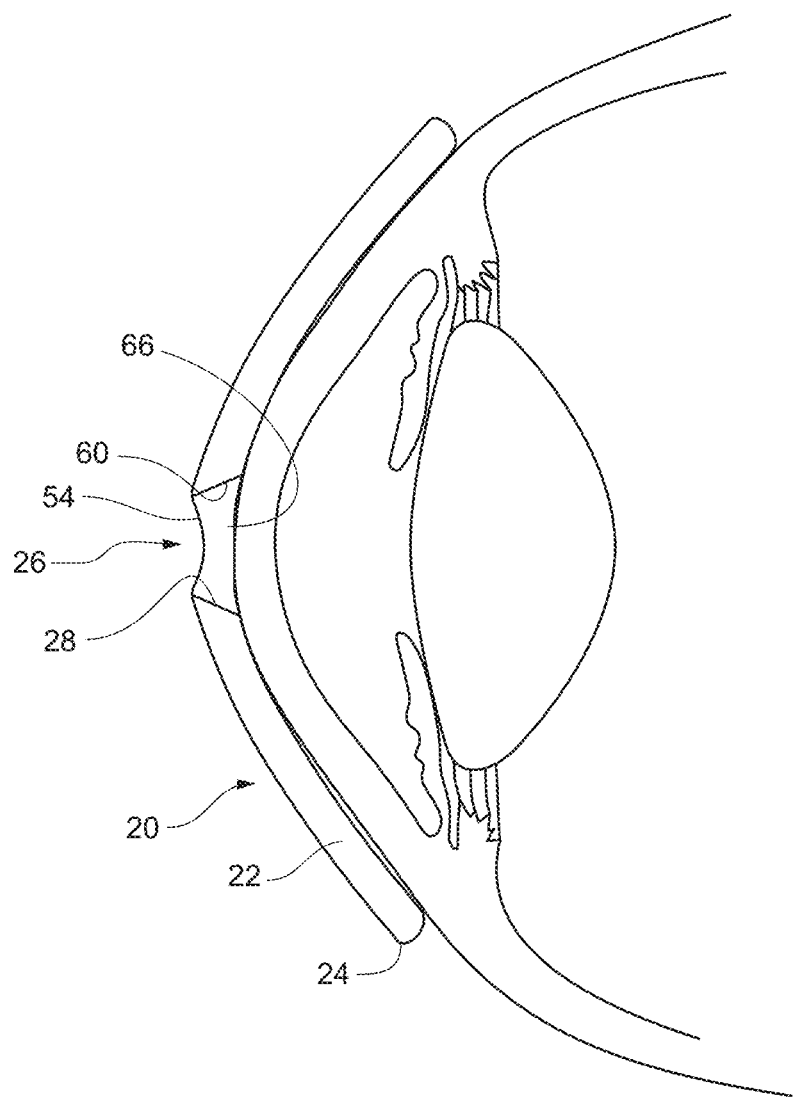
FIG. 9 is a cross-sectional view of a lens for refractive tear shaping in situ on a cornea with a central opening having inward angled edges and a concave tear meniscus according to an example embodiment of the invention.

Referring now to FIG. 9, lens for refractive tear shaping 20 with anterior acute tear shaping edge 60 is depicted. It is noted that anterior acute tear shaping edge 60 is arranged so that tear shaping edge 28 narrows from posteriorly-to-anteriorly. Concave tear meniscus 54 is also depicted. It is expected that anterior acute tear shaping edge 60 will create a more concave tear meniscus 54 thus, creating greater negative refractive power to concave tear meniscus 54.

Figure 10:
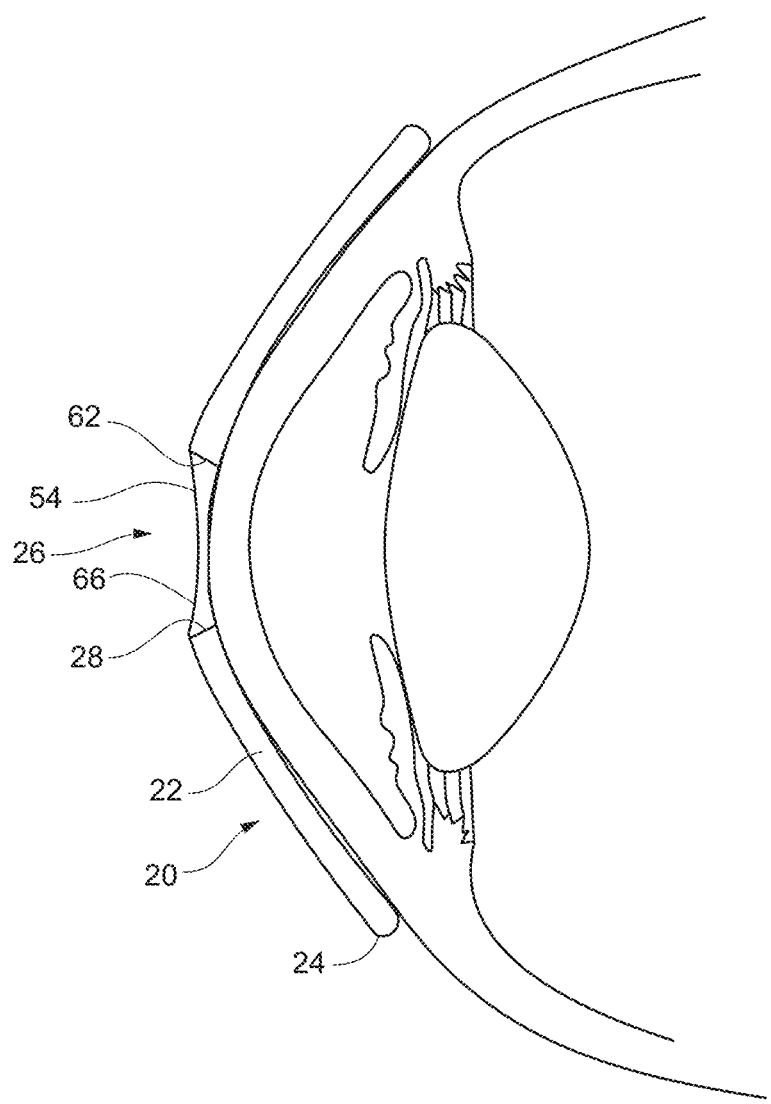
FIG. 10 is a cross-sectional view of a lens for refractive tear shaping in situ on a cornea with a concave tear meniscus and outwardly angled edges according to an example embodiment of the invention.

Referring now to FIG. 10, lens for refractive tear shaping 20 having anterior obtuse tear shaping edge 62 is depicted. Anterior obtuse tear shaping edge 62 is structured so that central opening 26 is wider anteriorly and narrower posteriorly. It is expected that anterior obtuse tear shaping edge 62 will create a flatter concave tear meniscus 54 as depicted in FIG. 10 thus, creating a concave tear meniscus having less negative refractive power than parallel tear shaping edge 52 having a similar posterior diameter.

Figure 11:
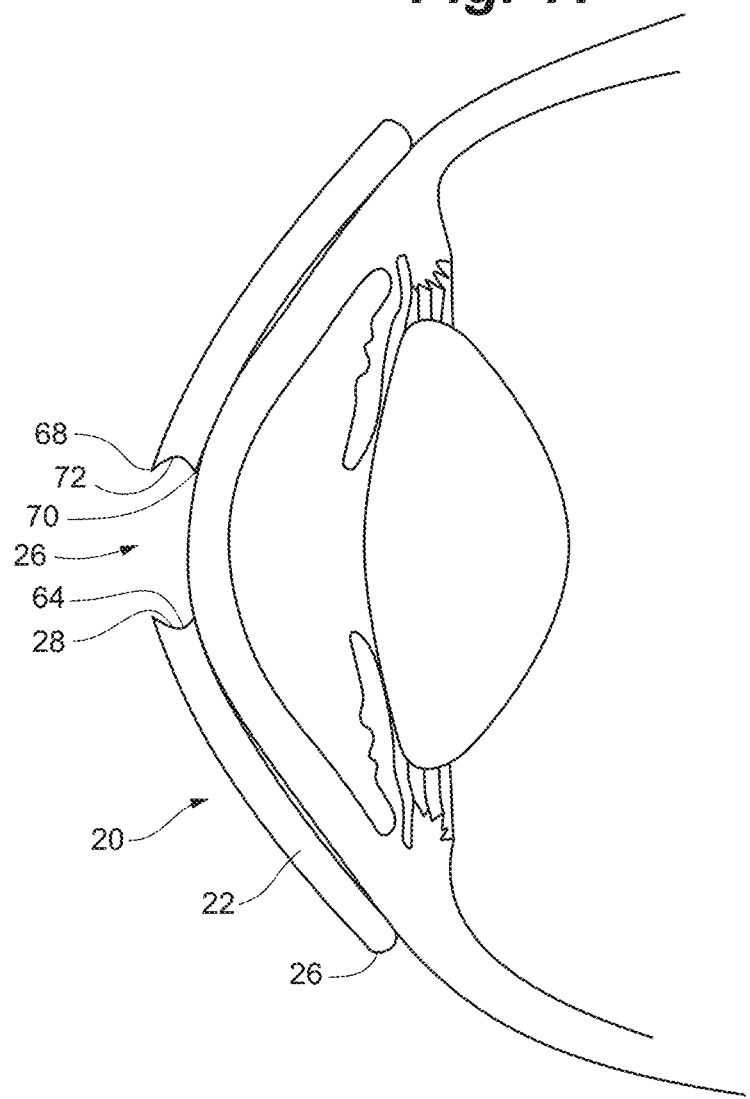
FIG. 11 is a cross-sectional view of a lens for refractive tear shaping having an opening with concave peripheral edges according to an example embodiment of the invention with the tear meniscus not depicted.

Referring now to FIG. 11, lens for refractive tear shaping 20 having concave tear shaping edge 64 is depicted. In FIG. 11, no tear meniscus 66 is depicted for clarity. Concave tear shaping edge 64 includes anterior edge 68, posterior edge 70 and concave portion 72.

Figure 12:
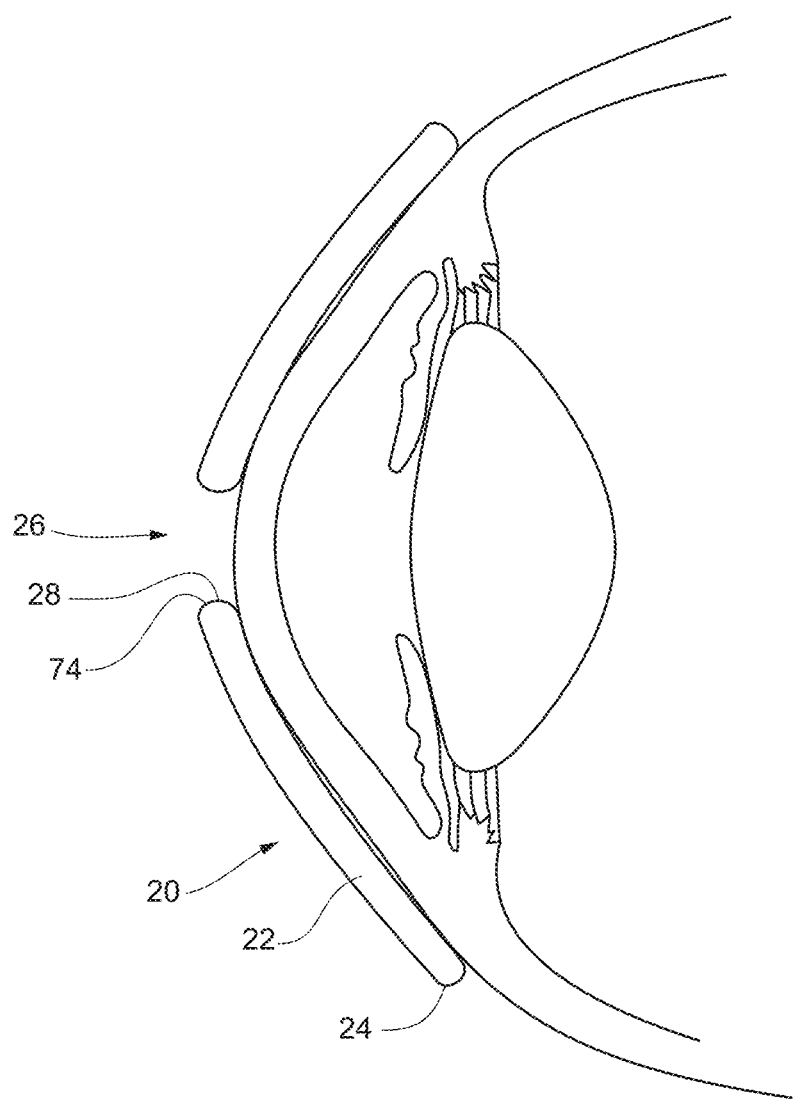
FIG. 12 is a cross-sectional view of a lens for refractive tear shaping having an opening with convex peripheral edges in situ on a cornea according to an example embodiment of the invention with the tear meniscus not depicted.

Referring now to FIG. 12, lens for refractive tear shaping 20 with convex tear shaping edge 74 is depicted. No tear meniscus 66 is depicted for clarity. In the depicted embodiment, convex tear shaping edge 74 has a radius of curvature approximately equal to half of depth 56 of tear shaping edge 20. This should not be considered limiting however as the radius of curvature of convex tear shaping edge 74 may vary.

Figure 13:
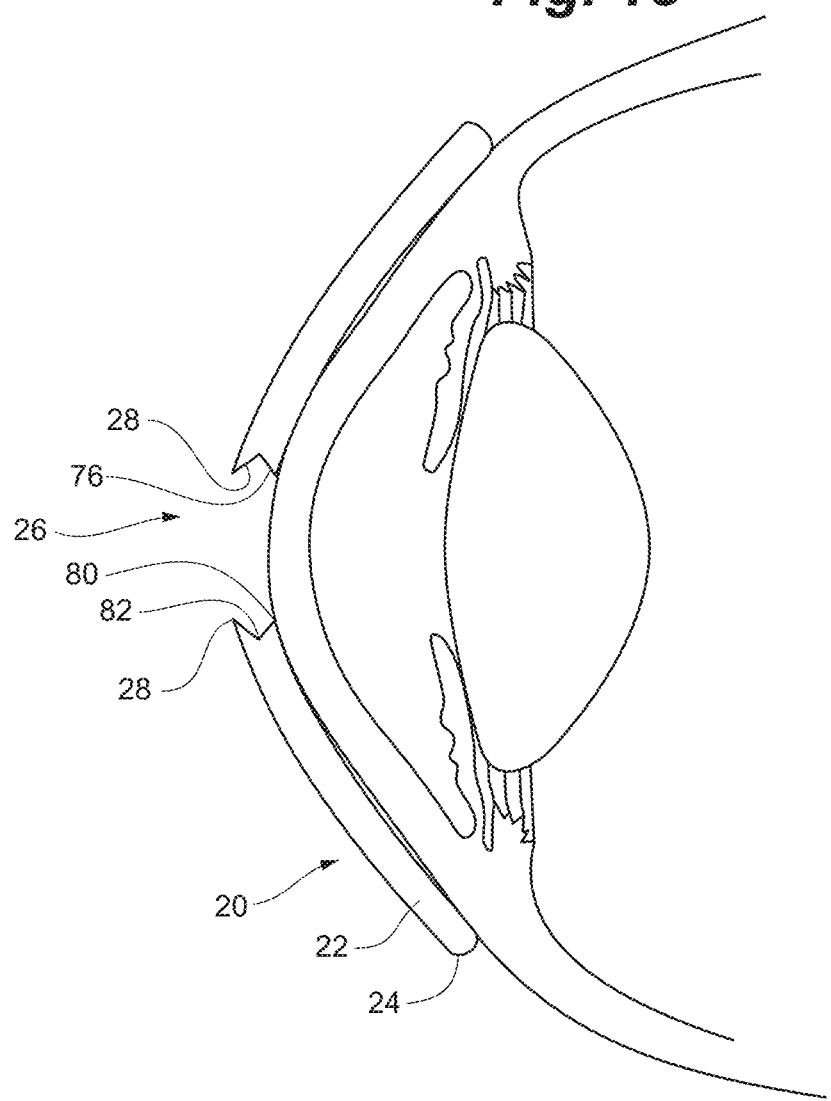
FIG. 13 is a lens for refractive tear shaping in situ on a cornea with an opening having polygonal peripheral edges with the tear meniscus not depicted.

Referring now to FIG. 13, lens for refractive tear shaping 20 with faceted tear shaping edge 76 is depicted. Faceted tear shaping edge 76 presents anterior edge 78, posterior edge 80 and internal angle portion 82.

Lens for refractive tear shaping 20 according to the various embodiments described herein may be formed from hydrogel polymers of the types used in soft contact lens that are now available or any hydrogel polymer materials to be developed in the future. Hydrogel polymers are generally water absorbent and hydrogel polymers may be used to manufacture lenses for refractive tear shaping 20 according to the invention by methods including but not limited to lathe cutting, cast molding, spin casting and injection molding. Lenses for refractive tear shaping 20 may also be manufactured from rigid oxygen permeable materials by known manufacturing processes including lathe cutting. It is to be understood that lens for refractive tear shaping 20 may be manufactured by any known contact lens manufacturing process or contact lens manufacturing processes to be developed in the future.

Lenses for refractive tear shaping 20 are expected to be made in diameters ranging from approximately 5 mm to 16 mm. Certain features of lens for refractive tear shaping 20 such as the diameter of central opening 26, the structure of tear shaping edge 28, the appropriate length of long axis 36 and short axis 38 to achieve desired refractive correction are expected to be developed with a certain degree of experimentation. It is expected that this degree of experimentation will not be undue and that those of ordinary skill in the art based on the present application disclosure will be able to engage in such experimentation without significant difficulty.

It is expected that for formation of concave tear meniscus 54, that smaller diameter central openings 26 will result in higher refractive power of concave tear meniscus 54, thus permitting higher degrees of refractive correction for myopia. It is also expected that when the diameter of central opening 26 becomes sufficiently small, tear meniscus 66 will transition from concave tear meniscus 54 to convex tear meniscus 58. Determination of this transition diameter for transition is expected to be achievable by reasonable levels of experimentation.

The effect of depth 56 of tear shaping edge 28 on refractive power of tear meniscus 66 also should be determinable by reasonable experimentation. It is expected that greater depth 56 will generally create a thicker periphery of tear meniscus 66 resulting in higher degrees to concavity of concave tear meniscus 54 and greater myopic correction.

Further, understanding of the effect of other features of the disclosed lenses including anterior acute tear shaping edge 60, anterior obtuse tear shaping edge 62, concave tear shaping edge 64, convex tear shaping edge 74 and faceted tear shaping edge 76 are expected to be achieved by reasonable experimentation well within the ability of one of ordinary skill in the art. It is expected that such experimentation will not be undue. It is also expected that the effect of stellate opening 40 with indentations 42 as well as stellate opening with appendages 44 and appendages 46 can also be determined experimentally.

Referring now to FIGS. 15-20, according to another embodiment of the invention, lens with partial depth cavity 84 is depicted in various embodiments.

Referring to FIG. 14, in the depicted embodiment, lens with partial depth cavity 84 generally includes lens body 86 presenting peripheral edge 88, central partial depth cavity 90, tear shaping surface 92, and cavity peripheral edge 94. Lens with partial depth cavity 84 is depicted as resting adjacent corneal surface 96. FIG. 14 depicts lens with partial depth cavity 84 having tear shaping surface 92 that is flatter in curvature than corneal surface 96, thus having a longer radius of curvature than corneal surface 96. Accordingly, in the depicted embodiment, tears underlying lens with partial depth cavity 84 generally provide a negative refractive power in addition to that provided by lens with partial depth cavity 84 alone due to tear lens 98.

Another example embodiment of lens with partial depth cavity 84 is depicted in FIG. 15. Structures labeled in FIG. 15 are similar to those labeled in FIG. 14 but tear shaping surface 92 of lens with partial depth cavity 84 depicted in FIG. 15 is curved more steeply than corneal surface 96 thus having a radius of curvature less than corneal surface 96 resulting in a positive powered tear lens 98.

Figure 16:
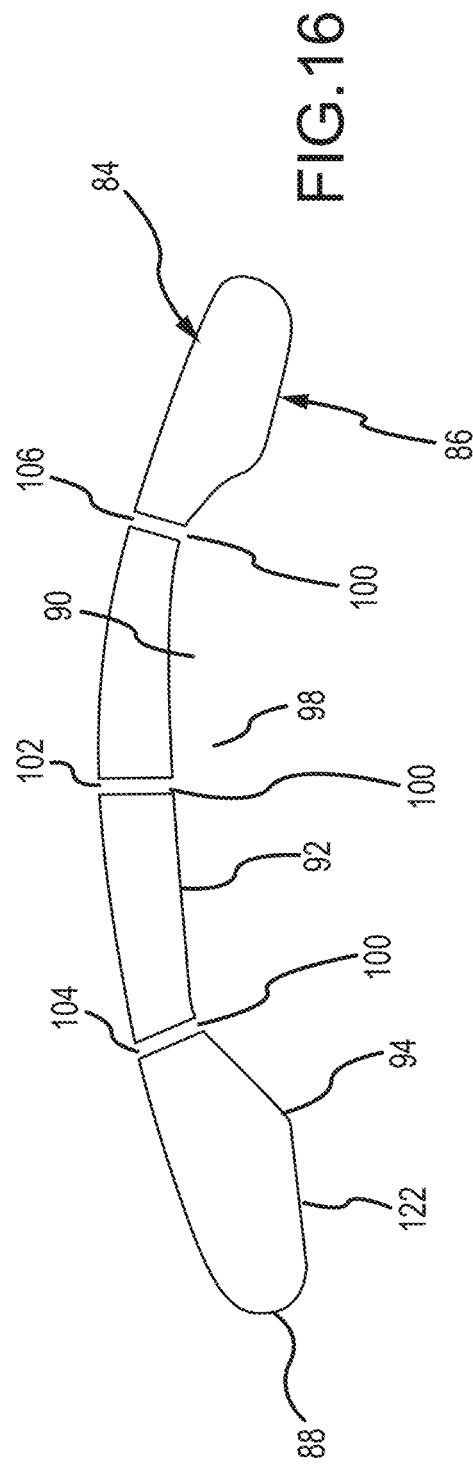
FIG. 16 is a cross-sectional view of a contact lens having a partial depth cavity flatter in curvature than the cornea, the lens body being pierced by a series of holes.
Figure 17:
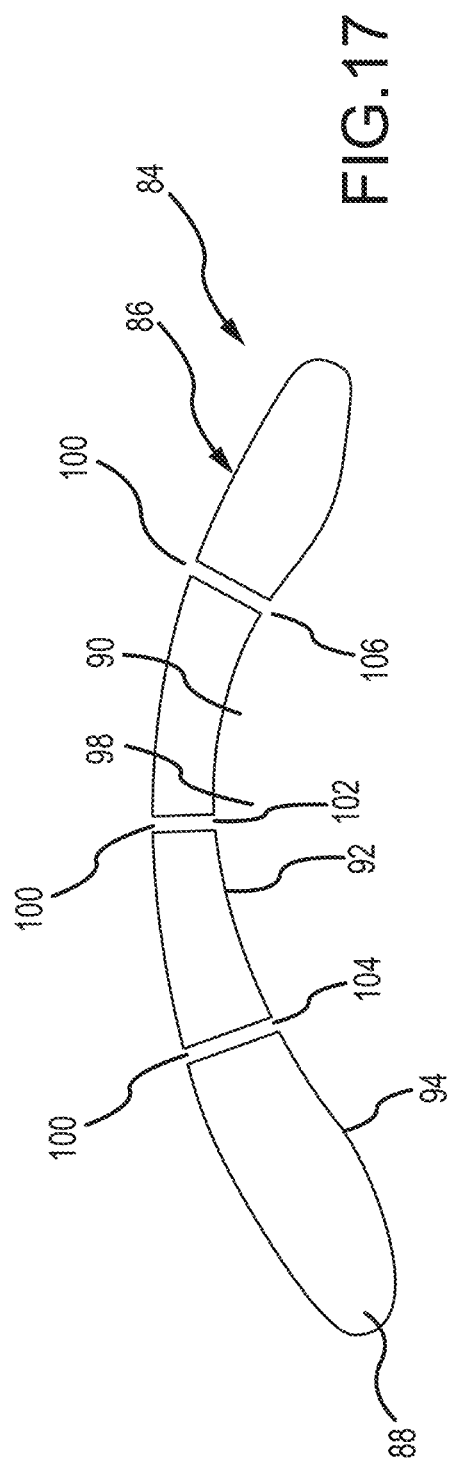
FIG. 17 is a cross-sectional view of a contact lens with a partial depth cavity having a steeper curvature than the cornea, the lens body pierced by a series of holes.

Referring now to FIGS. 16 and 17, according to the depicted embodiment, lens with partial depth cavity 84 includes at least one hole or passage 100 through lens body 86 as depicted. In the depicted embodiments, lens with partial depth cavity 84 presents central passage 102, first peripheral passage 104 and second peripheral passage 106. Any number of central passages 102 and peripheral passages 104 and 106 can be defined by lens body 86.

Figure 18:
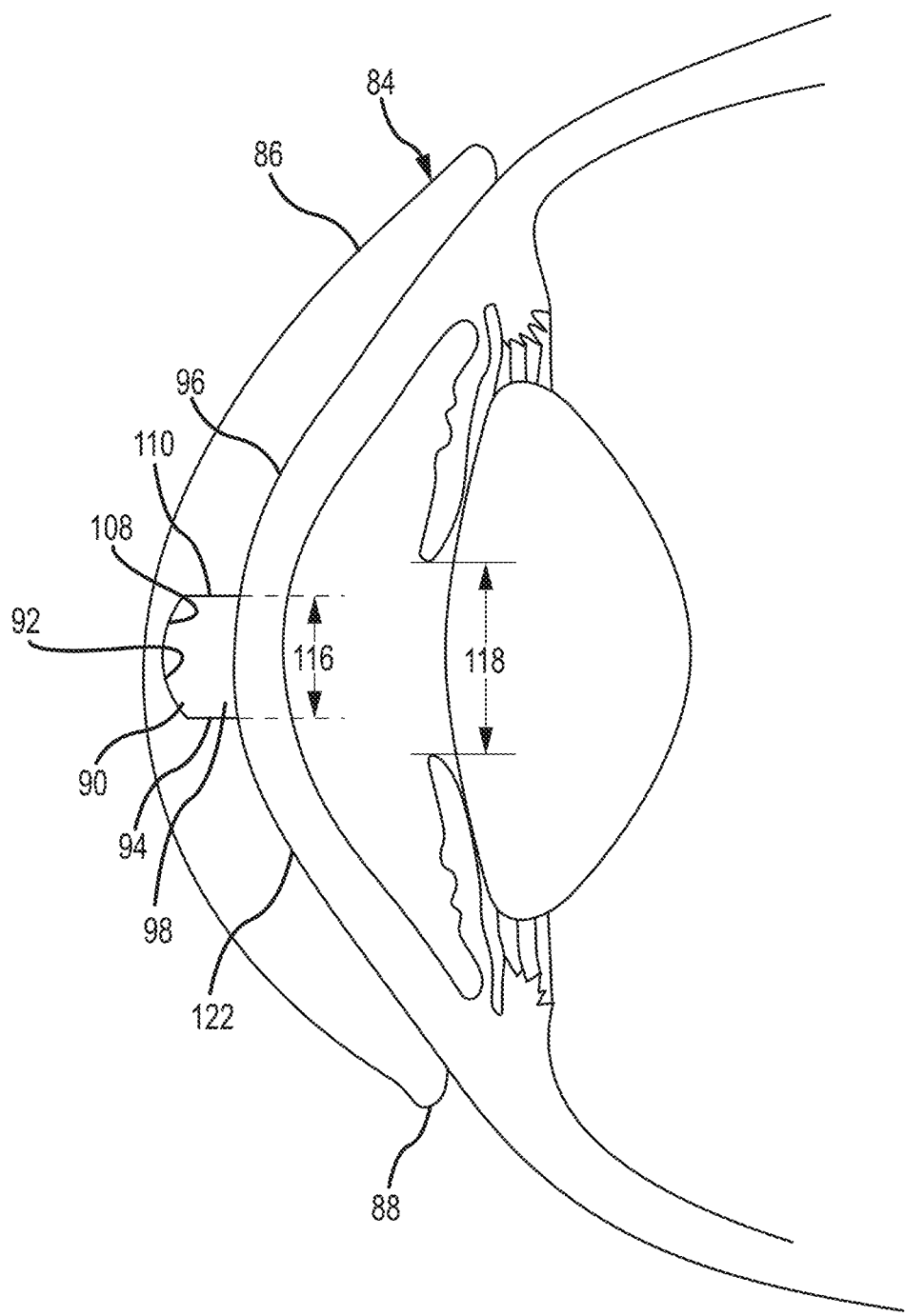
FIG. 18 is a cross-sectional view of a contact lens according to another example embodiment of the invention in situ on an eye.

Referring to FIG. 18, another embodiment of lens with partial depth cavity 84 is depicted. In the depicted embodiment, tear shaping surface 92 presents small diameter, concave tear shaping surface 108. In the depicted embodiment, cavity peripheral edge 94 includes generally parallel sides 110. For the purposes of this application, generally parallel sides 110 are considered to be generally parallel when they are within five degrees of parallel with each other.

Figure 19:
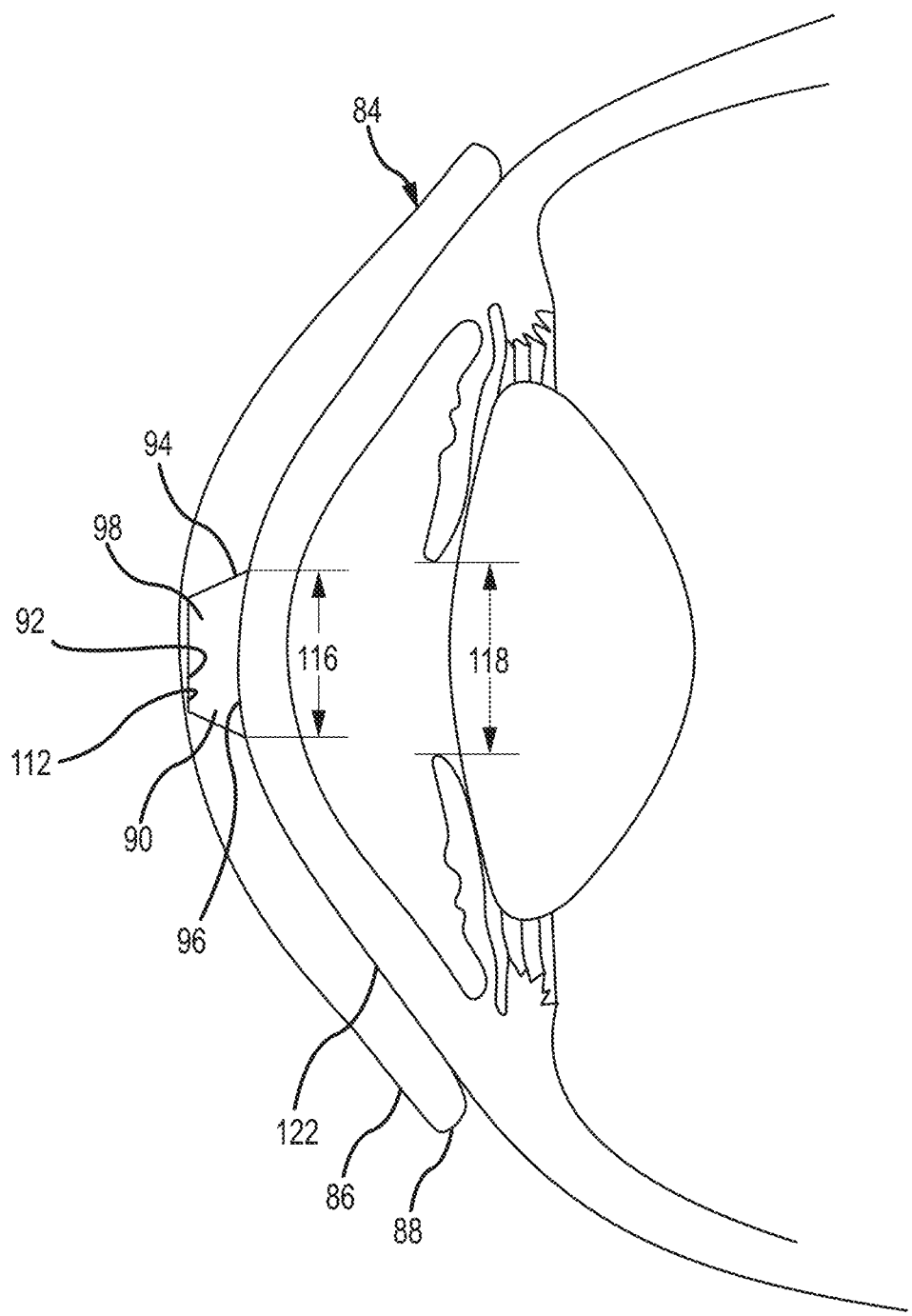
FIG. 19 is a cross-sectional view of a contact lens according to another example embodiment of the invention in situ on the eye.

Referring now to FIG. 19, another embodiment of lens with partial depth cavity 84 is depicted. In the depicted embodiment, central, partial depth cavity 94 is bounded by tear shaping surface 92 presenting concave to plano tear shaping surface 112. In the depicted embodiment, concave to plano tear shaping surface 112 is flatter in curvature and thus has a longer radius of curvature than corneal surface 96. In the depicted embodiment, cavity peripheral edge 94 presents non-parallel sides 114. Non-parallel sides 114 are considered to be non-parallel when the angle between non-parallel sides 114 is greater than five degrees relative to each other. In the depicted embodiment, central, partial depth cavity 94 has a cavity diameter 116 less than that of the pupil 118.

Figure 20:
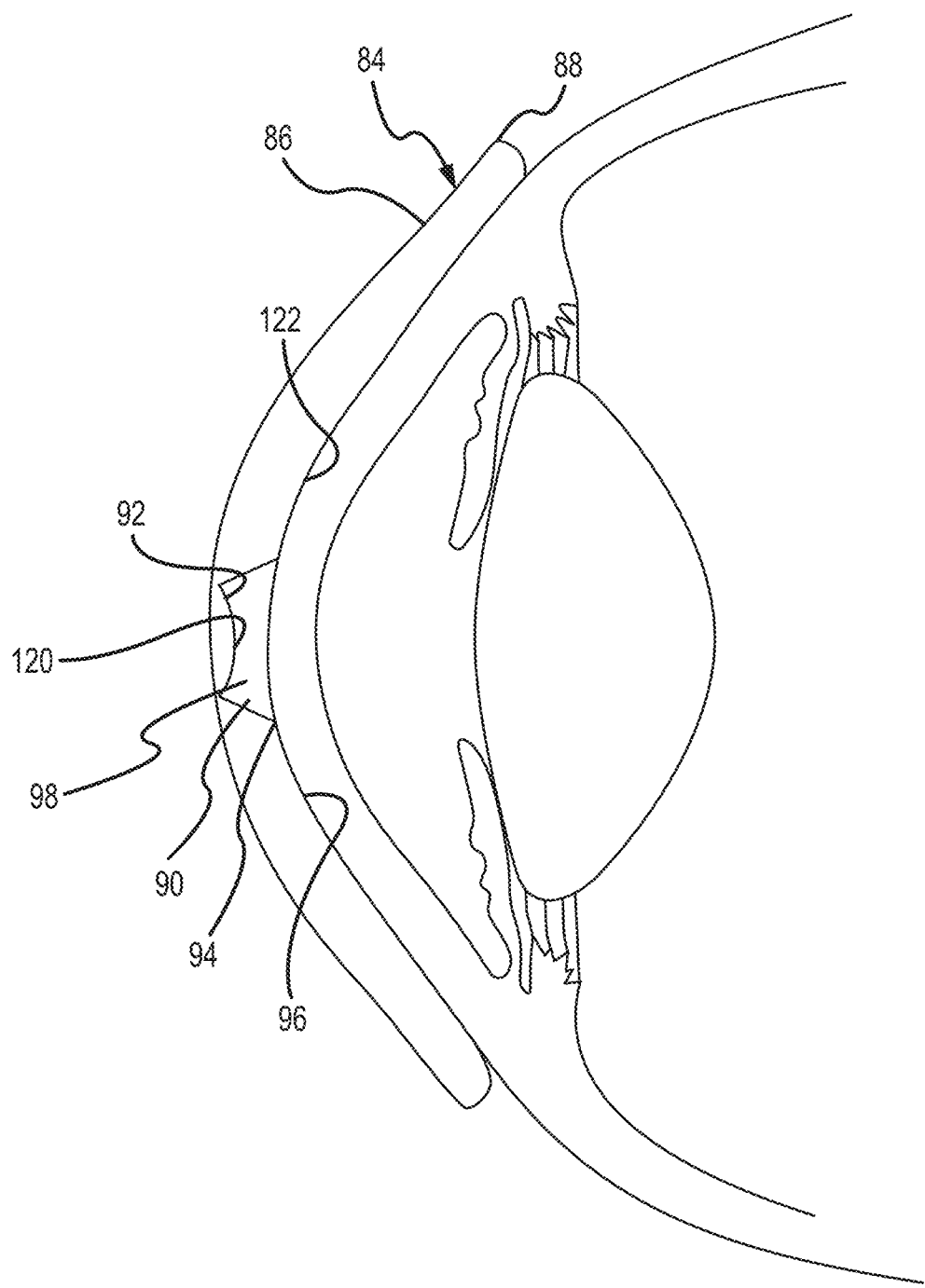
FIG. 20 is a cross-sectional view of another contact lens according to an embodiment of the invention in situ on an eye.

Referring now to FIG. 20, in the depicted embodiment, central, partial depth cavity 90 presents convex tear shaping surface 120 and non-parallel sides 114. Convex tear shaping surface 120 is not only flatter than corneal surface 96 but it is shaped so that an anterior surface of tear lens 98 is by concave, thus providing a stronger negative power to tear lens 98.

According to another example embodiment, lens 86 further presents base curve 122. Contrary to prior art base curve 121 is not the most central curve of lens body 86. The most central curve here is that of tear shaping surface 92. According to an example embodiment, base curve 122 is the curve of the posterior lens that immediately surrounds central partial depth cavity 90. Depth 124 of central partial depth cavity 90 is measured from an imaginary extension of based curve 122 across central partial depth cavity 90 to a center of tear shaping surface 92.

Figure 21:
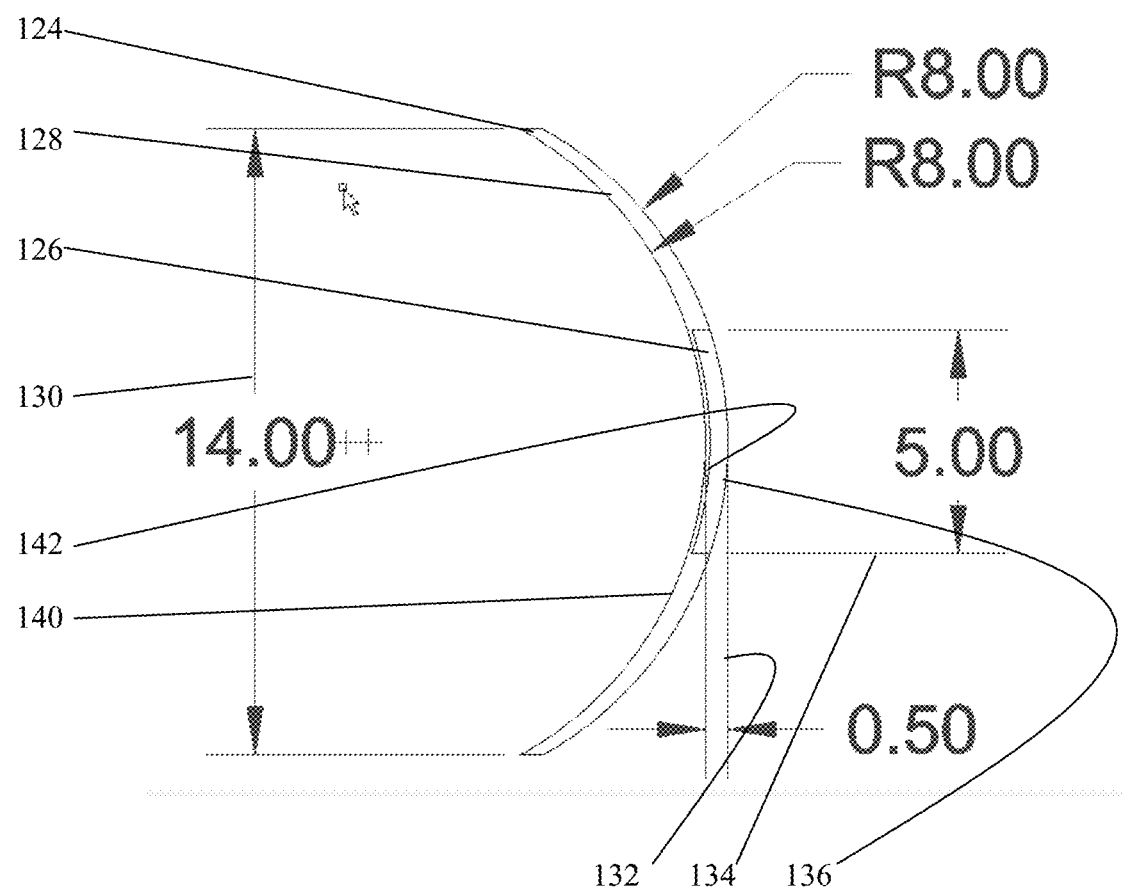
FIG. 21 depicts a contact lens with a partial thickness cavity at the center in an anterior convex surface according to an example embodiment of the invention FIG. 22A depict a section of a partial thickness cavity with a base surface of the partial thickness cavity having a curvature greater than a posterior surface of the contact lens according to an example embodiment of the invention.

Referring to FIG. 21, according to another example embodiment the invention, lens for refractive tear shaping 20 includes lens body 124 presenting anterior partial thickness cavity 126. According to the depicted example embodiment, soft contact lens 128 has overall diameter 130 of 14.0 mm. Central thickness 132 of soft contact lens 128 is approximately 0.50 mm. Note that central thickness 132 indicates what the central thickness of soft contact lens 128 would be absent the presence of partial thickness cavity 126. These dimensions are presented as an example only and are not to be considered limiting.

According to the depicted example embodiment:

$r_1$ represents anterior corneal radius of curvature of the anterior corneal surface;

$r_2$ represents posterior contact lens radius of curvature of the posterior surface of the soft contact lens;

$r_3$ represents partial depth cavity radius of curvature of the base surface of the partial depth cavity; and $r_4$ represents anterior contact lens radius of curvature of the anterior surface of the contact lens.

According to the depicted embodiment, posterior contact lens radius $r_2$ is approximately 8.00 mm and anterior contact lens radius $r_4$ is also approximately 8.00 mm. Partial depth cavity diameter 134 is approximately is approximately 5.00 mm. Partial depth cavity depth 136 is not specifically identified in this example but is less than central thickness 132 of 0.50 mm.

Soft contact lens 128 as discussed herein according to an example embodiment, presents anterior partial thickness cavity 126. Partial depth cavity diameter 34, according to example embodiments of the invention, is in a range between 2.0 mm and 6.0 mm, and according to another example embodiment is in a range of 3.0 mm to 5.0 mm.

Central thickness 132 is in a range of 50 µm to 500 µm according to an example embodiment. According to another example embodiment, central thickness 132 is in a range of 80 µm to 350 µm. Central thickness 132 indicates what the central thickness 132 of soft contact lens 128 would be absent the presence of partial thickness cavity 126.

Figures 22A, 22B, 22C:
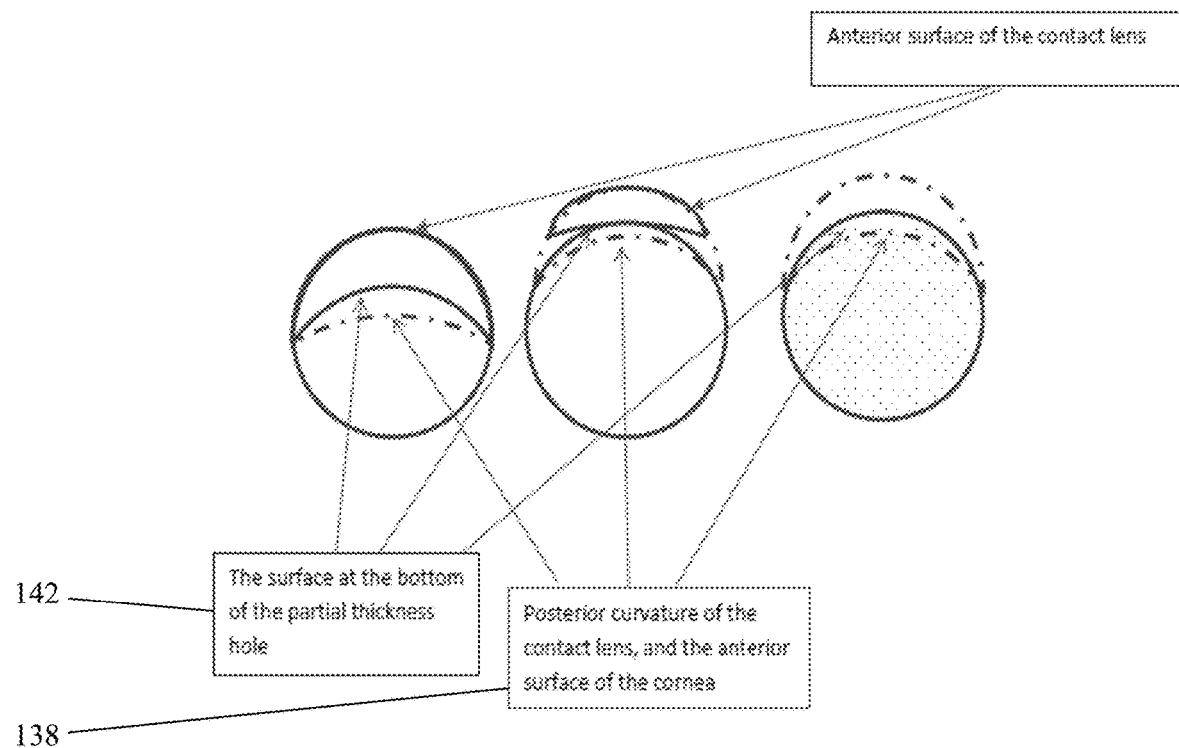
FIG. 22B depicts a section of a partial thickness cavity with a base surface of the partial thickness cavity having a curvature less than a posterior surface of the contact lens according to an example embodiment of the invention.
FIG. 22C depicts a section of a partial thickness cavity with a base surface of the partial thickness cavity having a diffractive surface relief according to an example embodiment of the invention

Referring now to FIGS. 22A, 22B and 22C, for the purposes of these depictions it is assumed that the anterior corneal surface 138 and posterior contact lens surface 140 are coincident. In fact, a layer of tear film laser lies between the anterior corneal surface 138 and posterior contact lens surface 140 and can be taken into account by known optical methods. Base surface 142 of anterior partial thickness cavity 126 is also depicted.

According to FIG. 22A, base surface 142 has curvature 144 greater than posterior contact lens service 140. It is of note that curvature and radius of curvature are reciprocal quantities.

According to FIG. 22B, base surface 142 has curvature 144 less than posterior contact lens surface 140.

According to FIG. 22C, base surface 142 presents diffractive surface relief 144.

The diffractive surface relief 144 may, for example, include a phase plate surface for phase modulation or according to another example embodiment a phase wrapped surface for amplitude modulation.

Typically the diffractive optic according to example embodiments of the invention is designed according to equation 1.

$$r_n = 2nf\lambda \qquad \text{Eq (1)}$$

wherein $r_n$ represents the radius of curvature of the diffractive element, n represents refractive index or the refractive index difference, if the diffractive optic is immersed in a fluid having a refractive index other than air, f represents focal length and $\lambda$ is the wavelength of light. According to example embodiments of the invention, the diffractive optical element is immersed in a fluid, the tear film, having a known refractive index different than air.

Figure 23A:
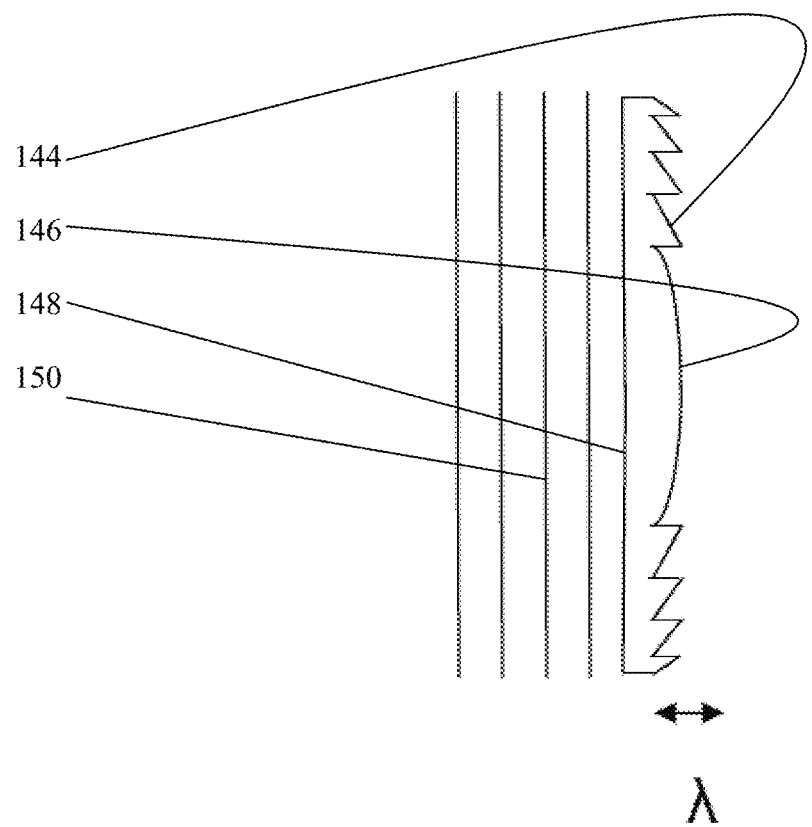
FIG. 23A depicts an example diffractive optical element as a surface profile at the base of a partial thickness cavity in a soft contact lens according to an example embodiment of the invention.

Referring to FIG. 23A, an example diffractive surface relief 144 is depicted. In the depicted embodiment, diffractive surface relief 144 includes Fresnel surface 146 and plano surface 148. Wavelength of light λ is also depicted along with optical wavefronts 150.

Figure 23B:
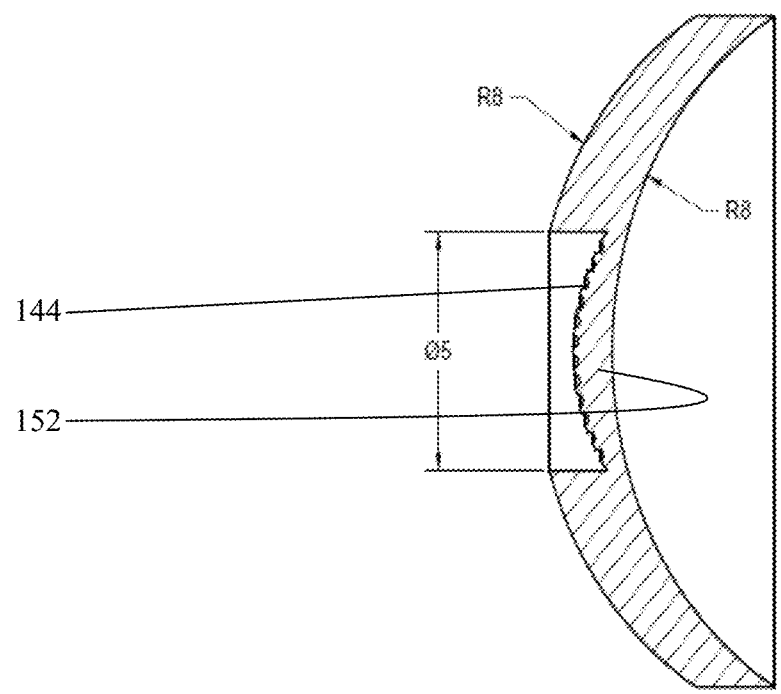
FIG. 23B depicts an example diffractive optical element is a surface profile at the base of a partial thickness cavity in a soft contact lens according to an example embodiment of the invention.

Referring to FIG. 23B, soft contact lens 128 is depicted with anterior partial thickness cavity 126 wherein base surface 142 includes diffractive surface relief 144.

Base thickness 152 extending from base surface 142 to posterior contact lens surface 140 may vary in a range between, for example, 10 μm and 100 μm. According to an example embodiment, base thickness 152 may be in the range of 25 μm to 75 μm.

Figure 24:
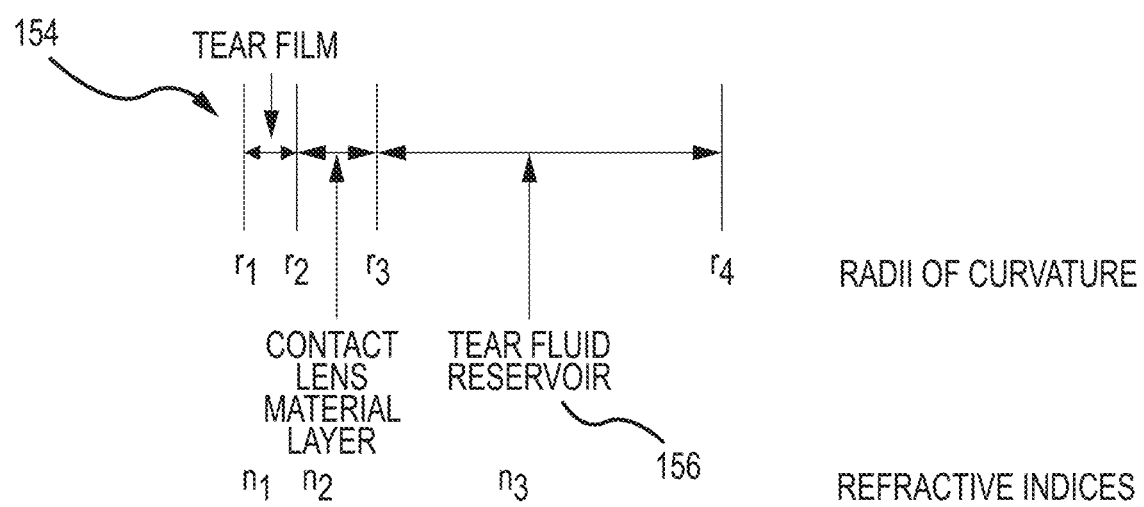
FIG. 24 depicts an optical train according to an example embodiment of the invention that may be modeled using a typical optical software program, for example, Zemax.

Referring to FIG. 24, optical train 154 is depicted. Optical train 154 includes radii of curvature $r_1$ representing the corneal curvature, $r_2$ representing the curvature posterior contact lens surface 140 of tear shaping lens 20, $r_3$ representing the radius of curvature of base surface 142 of anterior partial thickness cavity 126 and $r_4$ representing anterior radius of curvature of tear fluid reservoir 156. Here, $n_1$ represents diffractive index of the tear film between lens body 124 and the cornea, $n_2$ represents refractive index of the contact lens material and the $n_3$ represents the refractive index of the tear fluid reservoir 156. Optical train 154 can be modeled using an optical software program such as, for example, Zemax.

In operation, lens for refractive tear shaping 20 is placed on an eye overlying the cornea of the eye. Lens for refractive tear shaping 20 will typically center on the eye such that central opening 26, central partial depth cavity 94 or anterior partial thickness cavity 126 is approximately centered on the cornea and is approximately aligned with the visual axis of the eye. Tear lens 98 forms within central opening 26, central partial depth cavity 94 or anterior partial thickness cavity 126 as described above to provide desired refractive correction.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A lens for refractive tear shaping, comprising:
a curved lens body having a peripheral edge, an anterior surface, and a posterior surface, wherein the center of the curved lens body has a thickness in a range of 10 μm to 100 μm between the anterior surface and the posterior surface; and
an anterior partial thickness cavity formed in the anterior surface of the curved lens body, wherein the anterior partial thickness cavity includes an anterior facing base surface and a side wall connecting the anterior facing base surface to the anterior surface, wherein a tear lens is formed between the side wall and the anterior facing base surface when the lens is placed on an eye, and wherein the anterior facing base surface of the anterior partial thickness cavity has a curvature greater than a curvature of the posterior surface of the curved lens body.

2. The lens of claim 1, wherein the anterior facing base surface of the anterior partial thickness cavity has a curvature less than a curvature of the posterior surface of the curved lens body.

3. The lens of claim 1, wherein the anterior facing base surface of the anterior partial thickness cavity has diffractive surface.

4. The lens of claim 3, wherein the diffractive surface is defined by $$r_n = 2nf\lambda$$

wherein rn represents a radius of curvature of the diffractive surface, n represents a refractive index or a refractive index difference, if the diffractive surface is immersed in a fluid having a refractive index other than air, f represents a focal length and λ is a wavelength of light.

5. The lens of claim 1, wherein the anterior partial thickness cavity is positioned at an optical center of the curved lens body.

6. The lens of claim 1, wherein the anterior facing base surface of the anterior partial thickness cavity is convex.

7. The lens of claim 1, wherein the anterior facing base surface of the anterior partial thickness cavity is concave.

8. The lens of claim 1, wherein the anterior partial thickness cavity has an opening defined by the side wall having a shape selected from the group consisting of elliptical, oval, polygonal, stellate, and rectangular.

9. The lens of claim 1, wherein the side wall meets the anterior facing base surface at an outward angle relative to the anterior surface of the curved lens body.

10. The lens of claim 1, wherein the side wall meets the anterior facing base surface at an inward angle relative to the anterior surface of the curved lens body.

11. A lens for refractive tear shaping, comprising:
a curved lens body having a peripheral edge, an anterior surface, and a posterior surface; and
an anterior partial thickness cavity formed in the anterior surface of the curved lens body, wherein the anterior partial thickness cavity includes an anterior facing base surface and a side wall connecting the anterior facing base surface to the anterior surface, wherein a tear lens is formed between the side wall and the anterior facing base surface when the lens is placed on an eye, and wherein the anterior facing base surface has a curvature greater than a curvature of the posterior surface of the lens body.

12. The lens of claim 11, wherein the center of the curved lens body has a thickness in a range of 10 μm to 100 μm between the anterior surface and the posterior surface.

13. The lens of claim 12, wherein the anterior facing base surface of the anterior partial thickness cavity has diffractive surface.

14. The lens of claim 13, wherein the diffractive surface is defined by $$r_n = 2nf\lambda$$

wherein rn represents a radius of curvature of the diffractive surface, n represents a refractive index or a refractive index difference, if the diffractive surface is immersed in a fluid having a refractive index other than air, f represents a focal length and λ is a wavelength of light.

15. The lens of claim 11, wherein the anterior partial thickness cavity is positioned at an optical center of the curved lens body.

16. The lens of claim 11, wherein the anterior facing base surface of the anterior partial thickness cavity is convex.

17. The lens of claim 11, wherein the anterior facing base surface of the anterior partial thickness cavity is concave.

18. The lens of claim 11, wherein the side wall meets the anterior facing base surface at an outward angle relative to the anterior surface of the curved lens body.

19. The lens of claim 11, wherein the side wall meets the anterior facing base surface at an inward angle relative to the anterior surface of the curved lens body.

20. A lens for refractive tear shaping, comprising:
a curved lens body having a peripheral edge, an anterior surface, and a posterior surface, wherein the center of the curved lens body has a thickness in a range of 10 μm to 100 μm between the anterior surface and the posterior surface; and
an anterior partial thickness cavity formed in the anterior surface of the curved lens body, wherein the anterior partial thickness cavity includes an anterior facing base surface and a side wall connecting the anterior facing base surface to the anterior surface, wherein a tear lens is formed between the side wall and the anterior facing base surface when the lens is placed on an eye, wherein the anterior facing base surface of the anterior partial thickness cavity has diffractive surface defined by $$r_n = 2nf\lambda$$

wherein rn represents a radius of curvature of the diffractive surface, n represents a refractive index or a refractive index difference, if the diffractive surface is immersed in a fluid having a refractive index other than air, f represents a focal length and λ is a wavelength of light.

* * * * *